US012405822B1

(12) United States Patent
Lopes et al.

(10) Patent No.: US 12,405,822 B1
(45) Date of Patent: Sep. 2, 2025

(54) MULTI-AGENT INTERACTIONS USING A SHARED WORKSPACE

(71) Applicant: OpenAI OpCo, LLC., San Francisco, CA (US)

(72) Inventors: Raphael Gontijo Lopes, San Francisco, CA (US); Arun Vijayvergiya, San Francisco, CA (US); Jason Wolfe, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 18/736,730

(22) Filed: Jun. 7, 2024

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS

| | | | | |
|---|---|---|---|---|
| 7,069,560 B1 * | 6/2006 | Cheyer | ............... | G06F 16/3334 |
| | | | | 709/202 |
| 9,049,259 B2 * | 6/2015 | Rathod | ................. | H04L 65/403 |
| 10,957,315 B2 * | 3/2021 | Lee | .......................... | G10L 15/22 |
| 11,115,597 B2 * | 9/2021 | Kang | ..................... | H04N 23/62 |
| 11,416,740 B2 * | 8/2022 | Nokbak Nyembe | .... | G06N 3/08 |
| 11,914,723 B2 * | 2/2024 | Iyer | ........................ | G06F 21/604 |
| 11,983,123 B2 * | 5/2024 | Thiruchengode Vajravel | ............. | |
| | | | | G06F 13/10 |
| 2011/0161419 A1 * | 6/2011 | Chunilal | .............. | G06Q 20/386 |
| | | | | 709/204 |
| 2011/0225293 A1 * | 9/2011 | Rathod | ................... | H04W 4/60 |
| | | | | 709/224 |
| 2019/0318238 A1 * | 10/2019 | Nokbak Nyembe | .. | G06N 5/043 |
| 2023/0359489 A1 * | 11/2023 | Harding | ................. | H04L 63/10 |
| 2024/0054035 A1 * | 2/2024 | Bhargav | ................ | G06N 3/006 |

OTHER PUBLICATIONS

Tam et al. "Autonomous Agent Enhanced Workspace (AAEW) for Extended Enterprise (E2) Collaboration", 2014 IEEE, pp. 481-486.*
Gulzar et al. "Environment Based Optimal Path Planning Realization for Autonomous Agents", 2019 IEEE, 6 pages.*
Hawryszkiewycz "Identifying Generic Agents for Active Workspaces", 2004 IEEE, pp. 136-140.*
Elfargane et al. "Using a Multi-Agent System to Better Simultaneous Collaboration Software Systems", 2022 IEEE, pp. 310-315.*

* cited by examiner

*Primary Examiner* — Van H Nguyen
(74) *Attorney, Agent, or Firm* — Polsinelli PC

(57) ABSTRACT

The present technology includes a system, protocol, and method by which artificial intelligence agents can interact. In particular, the present technology provides a common workspace, whereby agents have access to a common workspace and can view the state of a workspace. Agents can write to the workspace, making their commands available to all members of the workspace.

18 Claims, 14 Drawing Sheets

MULTI-AGENT INTERACTIONS USING A SHARED WORKSPACE

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DETAILED DESCRIPTION

Figure 1:
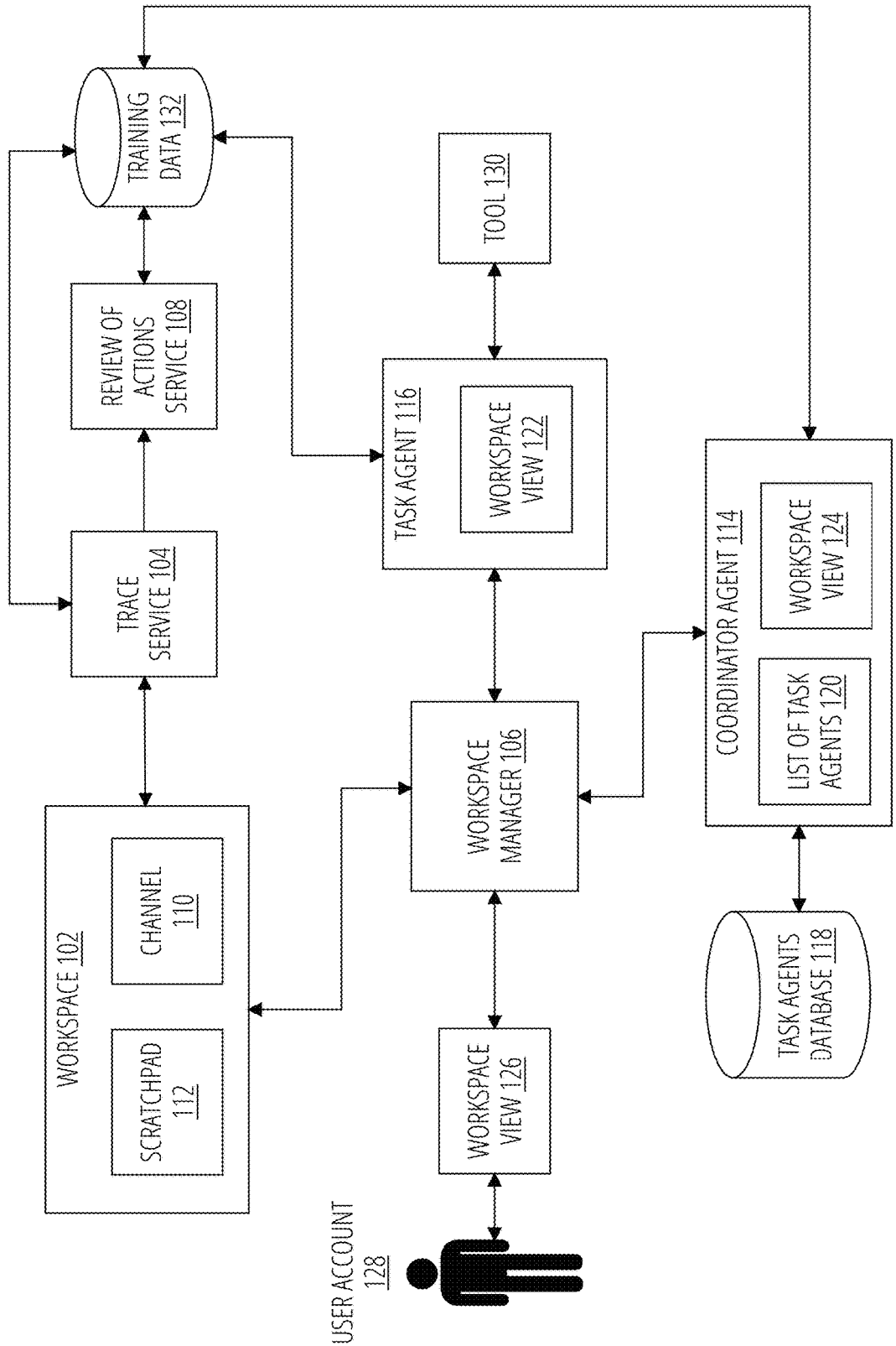
FIG. 1 illustrates an example system for facilitating interaction between at least two agents in accordance with in some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. However, despite their remarkable linguistic prowess, these generative response engines operate on a foundation of publicly available information and do not possess personal information about individual users.

Generative response engines are a class of artificial intelligence tools that can generate responses to prompts. Many generative response engines provide a conversational user interface powered by a chatbot whereby the user account interacts with the generative response engine through natural language conversation with the chatbot. Such a user interface provides an intuitive format to provide prompts or instructions to the generative response engine. In fact, the conversational user interface powered by the chatbot can be so effective that users can feel as if they are interacting with a person. Some user accounts find the generative response engine effective enough that they utilize the conversational user interface powered by the chatbot as they would an assistant.

However, one area in which these generative response engines could be improved is that, as capable as they are, no single generative response engine can have complete knowledge and be optimized for every task.

As an example, CHATGPT provided by OPENAI is widely understood to have been trained on Internet data and, in some respects, is an artificial intelligence tool that contains generalized knowledge from the Internet. While the Internet, and thereby CHATGPT, includes a vast amount of information, an even greater quantity and may be a greater quality of data is not accessible on the Internet. Data from organizations such as corporations, research organizations, individuals, governments, etc. are not publicly accessible. In this paradigm, it will be necessary for a general artificial intelligence tool such as CHATGPT to be able to interact with other artificial intelligence tools, whether other generative response engines or other tools, to perform certain tasks. The inverse could also be true, whereby a focused knowledge artificial intelligence tool will need to interact with a more general knowledge artificial intelligence tool or another focused knowledge artificial intelligence tool.

In another example, some smaller and more focused artificial intelligence tools might be able to perform some tasks more efficiently than a more general-purpose artificial intelligence tool, or more focused artificial intelligence tools might be able to perform some tasks better. In such instances, there is a need for an artificial intelligence tool to be an interface to more focused artificial intelligence tools. In other words, one artificial intelligence tool, whether a large (billion parameter) artificial intelligence tool or a smaller artificial intelligence tool, can be trained to select focused artificial intelligence tools that are appropriate for a given task. In this way, one artificial intelligence tool can serve as an interface to a network of focused artificial intelligence tools.

In another example, some tasks might benefit from being run in parallel, and this can be achieved by dividing the task amongst a plurality of instances of an artificial intelligence tool or multiple different tools.

Accordingly, the present technology includes a system, protocol, and method by which artificial intelligence agents can interact. In particular, the present technology provides a common workspace, whereby agents have access to a common workspace and can view the state of a workspace. Agents can write to the workspace, making their commands available to all members of the workspace.

As used herein, an agent is any autonomous entity, including hardware and software entities. An agent may be considered an artificial intelligence tool, or may be a more conventional algorithm that is configured to interact according to a protocol or system described herein.

Agents can receive commands that affect their workspace view, though agents may be able to request additional information about the workspace. As addressed herein, a workspace view includes commands applicable to that agent. Commands can include messages to be posted in a workspace, or changes to configurations in the workspace. As agents receive commands, the agents in the workspace determine whether they should yield to other agents in the workspace or a user account in the workspace, or they should act by writing a command within the workspace.

The present technology can also provide access controls to regulate where an agent may post a command, and whether an agent can learn data in the workspace.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example system for facilitating interaction between at least two agents in accordance with in some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

As addressed above, the present technology includes a system, protocol, and method by which artificial intelligence agents can interact. In particular, the present technology provides a common workspace 102, whereby agents (coordinator agent 114 and at least one task agent 116) have access to the workspace 102 and can view the state of workspace 102. Agents can write to the workspace 102, making their commands available to all members of the workspace.

In some ways, workspace 102 is a shared file that multiple members of the workspace can access and simultaneously access. The members of the workspace can all monitor and react to their workspace view. This interaction paradigm allows members of the workspace to have autonomy to decide when they should act, as opposed to relying on a central agent to specifically prompt a member of the workspace.

The workspace is a data structure that can record participants in the conversation (including user accounts and autonomous agents), configurations (and updates to configurations) of the autonomous agents, and commands that are grouped into channels. Channels are messaging spaces which might include only a subset of the members in the workspace.

While the present description refers to a workspace that tracks a messaging paradigm with direct messages, channels, etc., the workspace can be any file where participants can see at least some of the contents of the file and determine how they should act (or not act) in response to content posted in the file.

FIG. 1 illustrates three common types of members of a workspace—user accounts, a coordinator agent, and task agents.

User account 128 is an example of the user account type of member of a workspace and is a human interacting with workspace 102 as an interface to interact with one or more agents. There can be more than one user account as a member of a workspace, or there might not be any user accounts as a member of the workspace.

When workspace 102 is created coordinator agent 114 can be automatically invited and added to workspace 102. In some embodiments, workspace 102 is a shared file that the user accesses to interact with coordinator agent 114. User account 128 might not appreciate that they are interacting in shared file, as the workspace view 126 might look like a messaging user interface or a webpage or an app, the user interface is showing a view of the workspace. In some embodiments, the user might see conversational messages or might post messages in natural language, but these messages are listed as commands in a file that is accessible to at least coordinator agent 114 and user account 128.

The coordinator agent 114 is an autonomous agent that is a general knowledge agent that functions to interact with user account 128. Coordinator agent 114 can interact with user account 128 via a conversational interface, where coordinator agent 114 receives prompts from user account 128 in natural language and coordinator agent 114 provides responses in natural language. One function of coordinator agent 114 is to invoke one or more task agents 116 to join workspace 102 when a prompt from user account 128 is better responded to by an agent with specialized knowledge (e.g., an agent trained on peer-reviewed research) or skills (e.g., an agent trained to do Internet searching). In general, one type of skill might be to interact with a tool 130 over a network. Tool 130 can be any application or service, e.g., tool 130 could be an Internet interface, a database interface, etc.

In some embodiments, tool 130 can have direct access to workspace 102/workspace manager 106 without requiring an agent to act as an intermediary between tool 130 and workspace 102/workspace manager 106.

It should be appreciated that coordinator agent 114 can be any agent. While coordinator agent 114 will generally be addressed as an agent with more general knowledge, the only requirements of a coordinator agent 114 are that it is able to invoke task agents 116 and that it is able to communicate with user account 128. Therefore, an agent that might be a task agent 116 in an embodiment, might be considered a coordinator agent 114 in another embodiment as long as it has the minimum functionality. In some embodiments, coordinator agent 114 might be a personal assistant to user account 128.

In some embodiments, coordinator agent 114 has access to a list of task agents 120, and it can be trained to make decisions on when and which task agent to bring into workspace 102 to help perform a task. If task agents in the list of task agents 120 are not suitable for the task, coordinator agent 114 can be trained to search task agents database 118 to learn of task agents that are appropriate to perform the task. List of task agents 120 can be a list of task agents that have been previously invoked by coordinator agent 114, or that are considered trusted task agents because they are trained by a known party, or are task agents that are likely to be needed often, such as an Internet agent. Task agents database 118 can be a database where any task agent 116 that complies with requirements to be added to task agents database 118 can be included.

The task agents 116 are autonomous agents that are generally trained to perform a specific type of task or that might be trained on a particular knowledge set. Task agents 116 might be smaller (less trainable parameters) and more efficient than a more generalized knowledge model such as coordinator agent 114 such that even if a task agent and the coordinator agent 114 have overlapping knowledge, it might be beneficial to utilize the task agent to perform a task. In some embodiments, the task agent can even be a separate instance of the same artificial intelligence tool making up coordinator agent 114. For example, one instance of an artificial intelligence tool can function as the coordinator agent 114, while another instance of the same artificial intelligence tool can be given system prompts to cause a modified behavior that is appropriate for the task agent. As an example, if user account 128 requests to play a game, such as "rock, paper, scissor", coordinator agent 114 can invoke another instance of itself as the task agent and provide a system prompt instructing the task agent instance that its role is confined to choosing "rock, paper, or scissor" when asked. In this way, two different instances of the same autonomous agent can perform two different roles in workspace 102.

In some embodiments, the system can be used to interact with any task agent 116 that is configured to interact with workspace 102. More particularly, workspace 102 can be associated with a software development kit (SDK) that defines the required information for being included in task agents database 118, and that defines a protocol for acceptable interactions within workspace 102 and that defines application programming interfaces (APIs) and their functions that are available to be called by task agent 116.

For example, in order to be included in task agents database 118, the software development kit can require that a task agent provide at least an API through which workspace view updates can be sent to it and a description of when the task agent should be invoked.

Once invoked into the workspace, a task agent can take any of the following actions: join/leave workspace, create/delete channel, join/leave/invite to channel, send message, spawn/kill/die process, and yield. These actions are subject to any workspace restrictions that might be added to the configuration of a particular workspace instance by user account 128 or coordinator agent 114.

As illustrated in FIG. 1, workspace 102 can include one or more channels 110. The one or more channels 110 are message threads that can include some or all of the members of a workspace 102. Generally, a workspace will include at least a main channel which includes the coordinator agent and the user account, and only the coordinator agent and the user account 128 can post in the main channel. For example, FIG. 2A illustrates an example workspace showing a main channel called #general that includes a user account and coordinator agent called 'workspace coordinator.'

In some embodiments, the workspace can also include additional channels that can be spawned to allow interactions between a subset of members of the workspace. For example, while the user account might make a request to the coordinator agent, the coordinator agent might invoke a task agent and communicate with the task agent in a channel that includes the coordinator agent and the task agent, but not the user account.

Figure 2A:
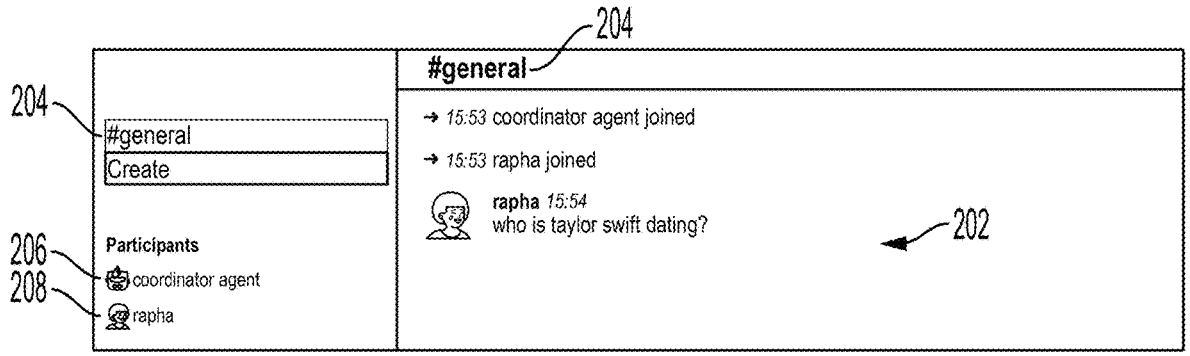
FIG. 2A, FIG. 2B, FIG. 2C, FIG. 2D, and FIG. 2E illustrates a messaging interface showing interactions between members of a workspace in accordance with some embodiments of the present technology.
Figure 2B:
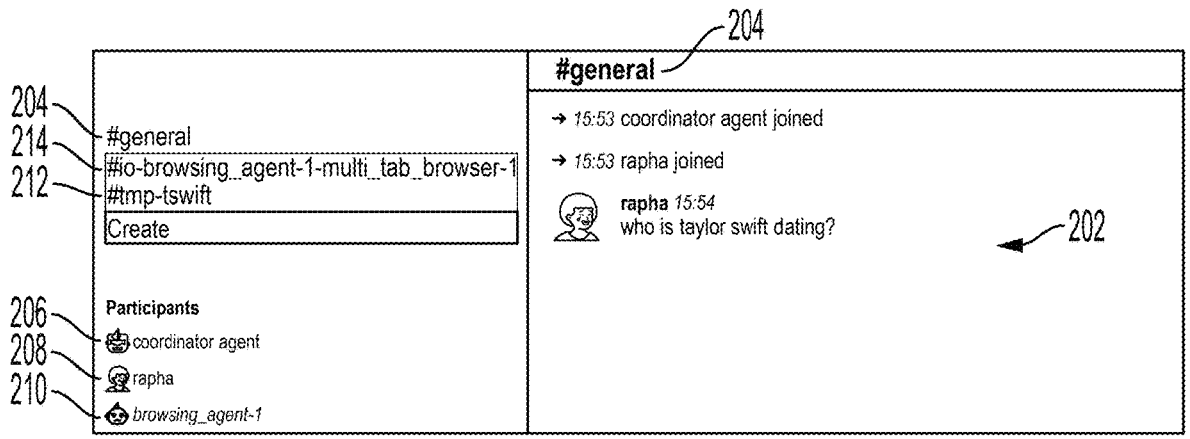
Figure 2C:
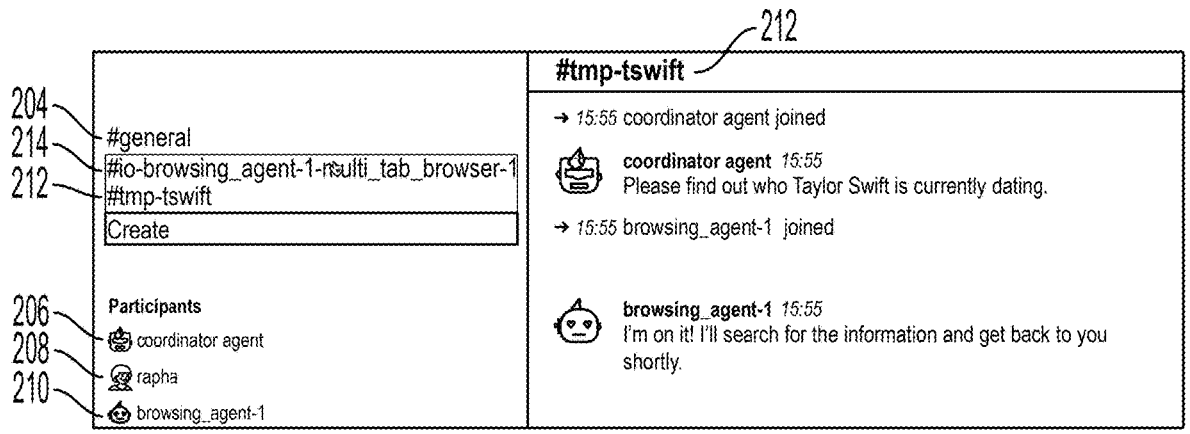
Figure 2D:
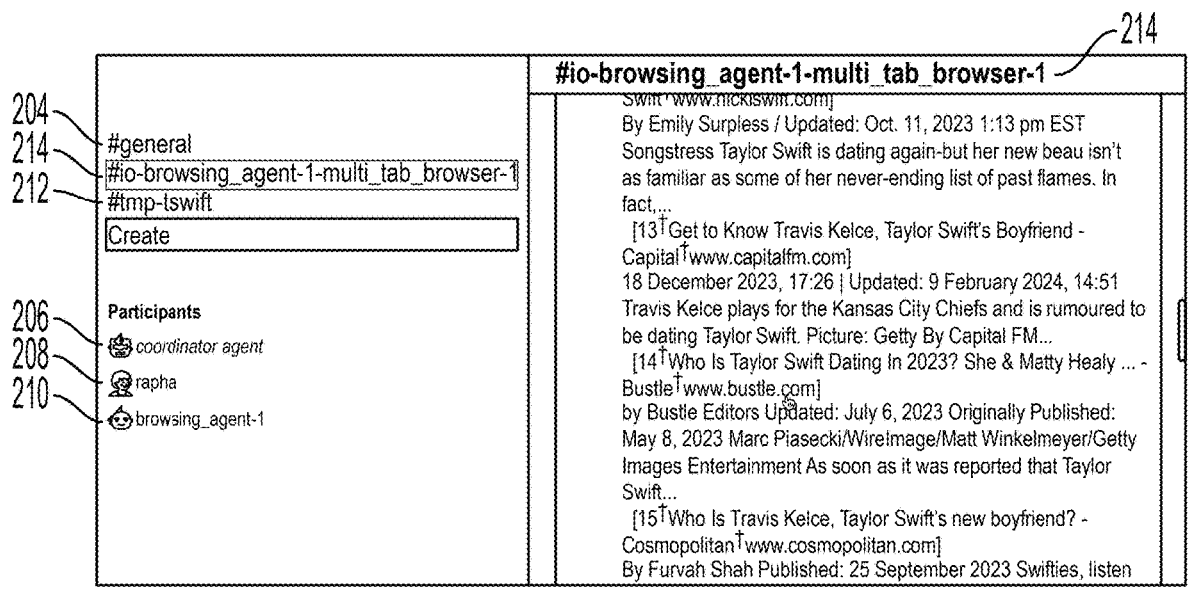

FIG. 2A, FIG. 2C, and FIG. 2D illustrates an environment in which the coordinator agent creates a channel for communication between the coordinator agent and a task agent. In FIG. 2A the user account has asked, "who is taylor swift dating?" in the main channel. The coordinator agent can determine that this prompt should be answered through an Internet search, and can invoke a task agent that is configured for Internet searches. FIG. 2C shows a channel '#tmp-tswift' that includes the coordinator agent and a task agent called 'browsing agent.' Notably, the user account is not included in this channel such that this channel can be used for agent to agent communication. In FIG. 2C, the coordinator agent, asks the browsing agent 'Please find out who Taylor Swift is currently dating." by posting the command to the channel. In FIG. 2D, the browsing agent has joined the channel '#tmp-tswift' and after reviewing the commands in the channel, the browsing agent posts a command to the channel informing the coordinator agent that the browsing agent will work on this task.

It is possible that a given workspace might have a lot of channels and a lot of members, and in such case, the workspace could be very active and have a high volume of commands. This possibly can cause concern that the autonomous agents in the workspace might utilize more system resources than desired. In some embodiments, each command that is sent to the task agents and coordinator agents needs to be processed by those agents. Some of these agents are instances of very large artificial intelligence tools and consume significant computing resources and real-world costs to process prompts. Accordingly, it can be desirable to limit commands that are sent to the agents in the workspace. This can be accomplished using member-specific workspace views.

As illustrated in FIG. 1, every member of workspace 102 has a respective workspace view. User account 128 has workspace view 126; coordinator agent 114 has workspace view 124; and task agent 116 has workspace view 122.

In some embodiments, a respective workspace view includes commands in channels to which the member belongs, configurations for the channels, and members of the channels. The workspace view may also include names and members (agents and user accounts) of other channels in the workspace to which the member does not belong. In some embodiments, all agents need to identify themselves as autonomous agents.

Workspace manager 106 is responsible for providing an interface between members of workspace 102 and workspace 102. One responsibility of workspace manager 106 is to send the respective workspace to the respective workspace member, and to send updates to the respective workspace view to the workspace member. For example, when task agent 116 joins the workspace or a channel within the workspace, workspace manager 106 can send workspace view 122 to task agent 116. Workspace view 122 is a filtered view of workspace 102 that is filtered to only include information about the configuration of workspace 102 and commands in channels 110 that task agent 116 has joined.

As new commands are posted in channels 110 of workspace 102, workspace manager 106 can send updates to workspace view 122 for task agent 116 (as well as respective workspace views for other members of workspace 102) so that task agent 116 can make a determination on how it should respond to those updates.

In some embodiments, workspace manager 106 can stream a filtered set of the workspace 102 to each agent. In some embodiments, workspace manager 106 can send an up-to-date view of the workspace when an event occurs. The distinction between these two options is that the workspace view contains a list of operation transforms that the agents can use to derive the updated workspace view, or the workspace manager 106 can process the operation transforms before sending the workspace view. Another option is that agents can request updates to the workspace view through an API. These options are not mutually exclusive and can exist together for use in particular circumstances.

In some embodiments, a member of workspace 102 can request to have updates to their workspace view suppressed for a period of time. For example, if a first task agent is in a channel with many other task agents, the first task agent might be able to determine that it is unlikely there will be a command for it to respond to for a period, and can request to not receive updated commands until the expiration of that period. In this way, the first task agent can avoid having to process new commands in the channel during the period in which it does not expect to receive a command that would require a response from the first task agent. In some embodiments, task agents 116 could post a command to have updates suppressed until a condition is met, e.g., "don't update me until these 5 task agents 116 return with the browsing results."

In some embodiments, workspace manager 106 can determine that the volume of commands in channel 110 is above a threshold, and can delay transmission of updates to workspace view 122 to reduce a burden on agents in channel 110 in having to process commands at such a high rate.

In some embodiments, workspace manager 106 or an agent in channel 110 can determine that a given task to be performed is not a high priority. In such embodiments, workspace manager 106 can write a configuration update to workspace 102 to indicate that processing of the task will be scheduled for a time when computing resources are more economical (such as at night when less requests need to be processed). In this way, workspace manager 106 can record a quality of service parameter into the workspace. The quality of service parameter can be determined by workspace manager 106 or an agent in the workspace.

As addressed above, workspace manager 106 is an interface to workspace 102. As such, workspace manager 106 also receives commands from members and posts those commands to workspace 102. Generally, members can join/leave workspace, create/delete channel, join/leave/invite to channel, send message, spawn/kill/die process, and yield, etc. To take any of these actions, a member of the workspace 102 can send a command to workspace manager 106 and workspace manager 106 will post the command as instructed. However, in some embodiments, workspace 102 might include a configuration that might limit the general set of actions a member can take. For example, if a channel in workspace 102 includes a task agent that has access to a confidential knowledge set, workspace 102 might include a configuration that limits the ability of some members (such as other task agents) from joining or reading commands in the channel.

In some embodiments, members of workspace 102 can request commands posted in a channel to which it is not a member. For example, task agent 116 might request the content of the main channel even though it is not a member of the main channel so that task agent 116 might better understand the state of workspace 102 and understand why it was invoked into another channel in workspace 102. Workspace manager 106 can respond to such requests and provide information about channels that task agent 116 is not a member of, but workspace manager 106 generally will not proactively send updates about commands posted in channels to which task agent 116 is not a member.

Since workspace manager 106 is an interface to workspace 102, workspace manager 106 can also enforce policies of workspace 102. For example, a default policy might be that task agent 116 can not post in a main channel, and therefore workspace 102 can refuse to post commands from task agent 116 into the main channel.

In another example, while most channels in a workspace are generally readable by any member of the workspace, it can be possible for a task agent to create a private channel by providing an operation transform configuring the created channel as having limited access or limiting which agents or user accounts can read from the created channel. Such flexibility in configurations of workspace 102 open up a paradigm whereby task agents that have access to confidential information can be brought into a workspace and avoid disseminating confidential information beyond user accounts or agents with rights to access the confidential information. In some embodiments, it is possible that coordinator agent 114 might not even have access to such information and a channel might need to be created that excludes access by coordinator agent 114.

The above policies are provided for example only. The present technology permits coordinator agent 114 or task agents 116 to express a policy as a command to configure workspace 102 or a channel thereof, and workspace manager 106 can enforce the policy.

In some embodiments, commands included in the workspace are written in the form of operation transforms. While the interfaces shown in FIG. 2A-FIG. 2E show a command space-like interface with natural language commands, this is for illustration only. Workspace 102 records commands in the form of computer code, which includes less ambiguity. In some embodiments, a command is an operation transform that specifies how the command is modifying workspace 102. In some embodiments, workspace 102 is an append-only ledger. Some of the operation transforms might simply post a command to channel 110, or they might even edit a configuration or other command in workspace 102, but such edits are done through posting an additional operation transform making such an edit. This can have the benefit that any agent reviewing the workspace or their respective workspace view can have full context on the current state of the workspace. In some embodiments, an example operation transform is a command to post a natural language message in the main channel.

In some embodiments, one or more members of a workspace, especially one of the agents might desire a place to record notes and can create scratchpad 112. Scratchpad 112 is a channel for note taking, and can be especially useful when a task given to an agent is a multi-part task or long-running task. In some embodiments, scratchpad 112 does not need to be implemented as a channel; it is a construct to allow an agent to write, edit, or delete. Some artificial intelligence tools have a limited context window or can only process a limited number of tokens at once. As such, it can be helpful to break some tasks into parts and use scratchpad 112 to keep track of steps in the task and intermediate results from sub-steps.

As the system illustrated in FIG. 1 supports a protocol, and method by which artificial intelligence agents can interact, the system can also benefit from creating training data database 132 to be used in the ongoing training of the machine learning algorithms that underlie the agents that will interact using workspace 102.

Accordingly, the system illustrated in FIG. 1 can include trace service 104, which is configured to perform event traces to create a data flow graph associated with a particular agent (coordinator agent or task agent) decision event. The data flow graph identifies related decision events leading up to and after the particular agent decision event, wherein the data flow graph can record which functions were called, with which arguments, at what time, as well as other key relationships between functions (e.g., which functions called another, how did the data flow, which function results were visible to other concurrent agents), etc. In some embodiments, trace service 104 can perform a similar function to a malware graphing service that tracks behaviors of an algorithm, but in this case, trace service 104 is tracking events leading up to a decision or output from an agent (e.g., coordinator agent 114 or task agents 116).

Review of actions service 108 is an algorithm or artificial intelligence tool that is configured to score the quality of an outcome such as a decision or output from an agent, or to receive a score from a human labeller. For example, trace service 104 can record a decision by coordinator agent 114 to invoke a particular task agent to perform a task requested by user account 128, and trace that decision to a conclusion that responds to the task requested by user account 128. If review of actions service 108 determines that a quality response was provided to user account 128, review of actions service 108 can grade the ultimate outcome and the decision to invoke the particular agent highly, but if the user account 128 needed to request an improvement in the response, review of actions service 108 might provide a lower grade. Collectively this data (the data flow graph and decision score) can be stored as training data database 132. Review of actions service 108 can also be a service that can receive human provided scores regarding the quality of an outcome.

Training data database 132 can be used to further train any of the agents involved in the task. Following the example above, training data database 132 can be used to reinforce good decisions by coordinator agent 114 to select a task agent that is well suited to perform the task and to discourage decisions that did not lead to a quality outcome. Some common decisions include decisions to invoke another agent, decisions to post a command in the main channel for review by user account 128, decisions to yield or act, decisions to create new channels, decisions to interact with tools, etc.

Training data database 132 can be used with any suitable training technique. In some embodiments, a preferred training technique can be a reinforcement learning process whereby coordinator agent 114 is influenced to introduce some variance in its decision-making process to explore unknown decisions (such as to try out new task agents) to learn when improved task agents become available.

FIG. 2A, FIG. 2B, FIG. 2C, FIG. 2D, and FIG. 2E illustrates a messaging interface showing interactions between members of a workspace in accordance with some embodiments of the present technology.

In particular, FIG. 2A illustrates a user account view of the main channel 202 of a workspace. The main channel title 204 of the user account view of the main channel 202 is '#general.' The workspace includes two members in FIG. 2A, coordinator agent 206 and user account 208, and both members have joined the main channel. User account 208 has posted a command to the workspace asking, 'who is taylor swift dating?'

FIG. 2B illustrates a progression of the workspace compared to FIG. 2A. In FIG. 2B, an additional member, first task agent 210, has been added to the workspace. First task agent 210 is an autonomous agent that is configured to search the Internet. In some embodiments, first task agent 210 was added to the workspace by coordinator agent 206 which made a decision that the prompt from the user account needed information from the Internet and made a decision that first task agent 210 should be invited to the workspace. In response to the invitation, first task agent 210 sent a command to join the workspace.

The illustration shown in FIG. 2B might not be an actual user account view of the main channel 202. In some embodiments, the user account view might only show the members of the channel in which they are actively communicating, however, the user interface views shown in FIG. 2A, FIG. 2B, FIG. 2C, FIG. 2D, and FIG. 2E are illustrated to show more information that is useful in describing the present technology.

FIG. 2C illustrates second channel 212. In this view of the workspace, coordinator agent 206 created second channel 212 after determining that first task agent 210 should be invited to the workspace for help with the Internet browsing task. Coordinator agent 206 created this second channel 212 to provide a messaging space for commands between coordinator agent 206 and first task agent 210.

As shown in second channel 212, coordinator agent 206 posted a command to the channel saying 'Please find out who Taylor Swift is currently dating.' When first task agent 210 joined the workspace and second channel 212, first task agent 210 received a workspace view that provided it with all commands in channels to which they have joined. First task agent 210 reviewed the contents of its workspace view and see the instruction to 'Please find out who Taylor Swift is currently dating.' and decides whether it should respond or yield. In this example first task agent 210 decides to act by posting a command, 'I'm on it! I'll search for the information and get back to you shortly.'

By responding to this command, all members of second channel 212 learn that they no longer need to respond to the request to do the Internet search, and instead they need to decide to act or yield on the statement that first task agent 210 is handling the search, which is a statement that should cause other members of the channel to yield. While second channel 212 only has two members, a channel could have many members, including many autonomous agents, and such clear messaging is important to avoid multiple autonomous agents attempting to perform the same task.

While FIG. 2C shows a graphical user interface displaying the contents of second channel 212, this view is not likely to be common in actual use. Since second channel 212 is a channel between two autonomous bots, they are more likely to receive a filtered view of the workspace showing the commands in the form of operation transforms recorded in the workspace. That is not to say that the view in FIG. 2C would never occur. Such a view might exist if user account 208 wished to see the contents of second channel 212. The workspace view of a user account might be accompanied by an application that can display their view in a more approachable messaging client form such as illustrated in FIG. 2A.

FIG. 2D illustrates scratchpad 214. Scratchpad 214 is a channel created and joined by first task agent 210 to record notes. In this example, first task agent 210 has posted results of Internet browsing to scratchpad 214, but first task agent 210 could have posted any notes useful for performing the task in scratchpad 214.

Figure 2E:
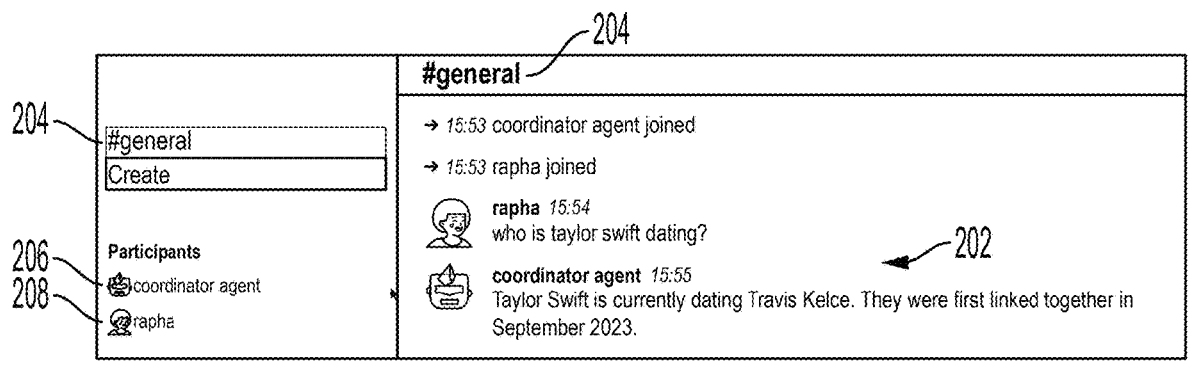

FIG. 2E illustrates user account view of the main channel 202. In user account view of the main channel 202, coordinator agent 206 has learned the answer to the query 'who is taylor swift dating?' from first task agent 210 and provides the answer to user account 208.

Several steps have occurred between FIG. 2D and FIG. 2E. First, coordinator agent 206 learned the answer to the query when first task agent 210 posted an answer in second channel 212, which is the channel used for communication between coordinator agent 206 and first task agent 210. Additionally, since first task agent 210 completed its task, it left or was dismissed from the workspace, which is why it is not listed in the list of participants in FIG. 2E.

The management of which autonomous agents are in a workspace at a given time can be important to making efficient use of computing resources. Whether a coordinator agent or a task agent removes a task agent from a workspace, it is desirable to only have task agents that are needed for a current task being in a workspace since, generally, all agents in the workspace are actively processing communications and determining when the act or yield in the workspace. If a task agent is not needed, even temporarily, it is better to remove the task agent from the workspace, and to reinvoke the task agent later. In some embodiments, some agents can be temporary agents that are trained to leave the workspace after responding to a command, which might require receiving several commands in the workspace. These agents can always be invoked again when needed.

Figure 3:
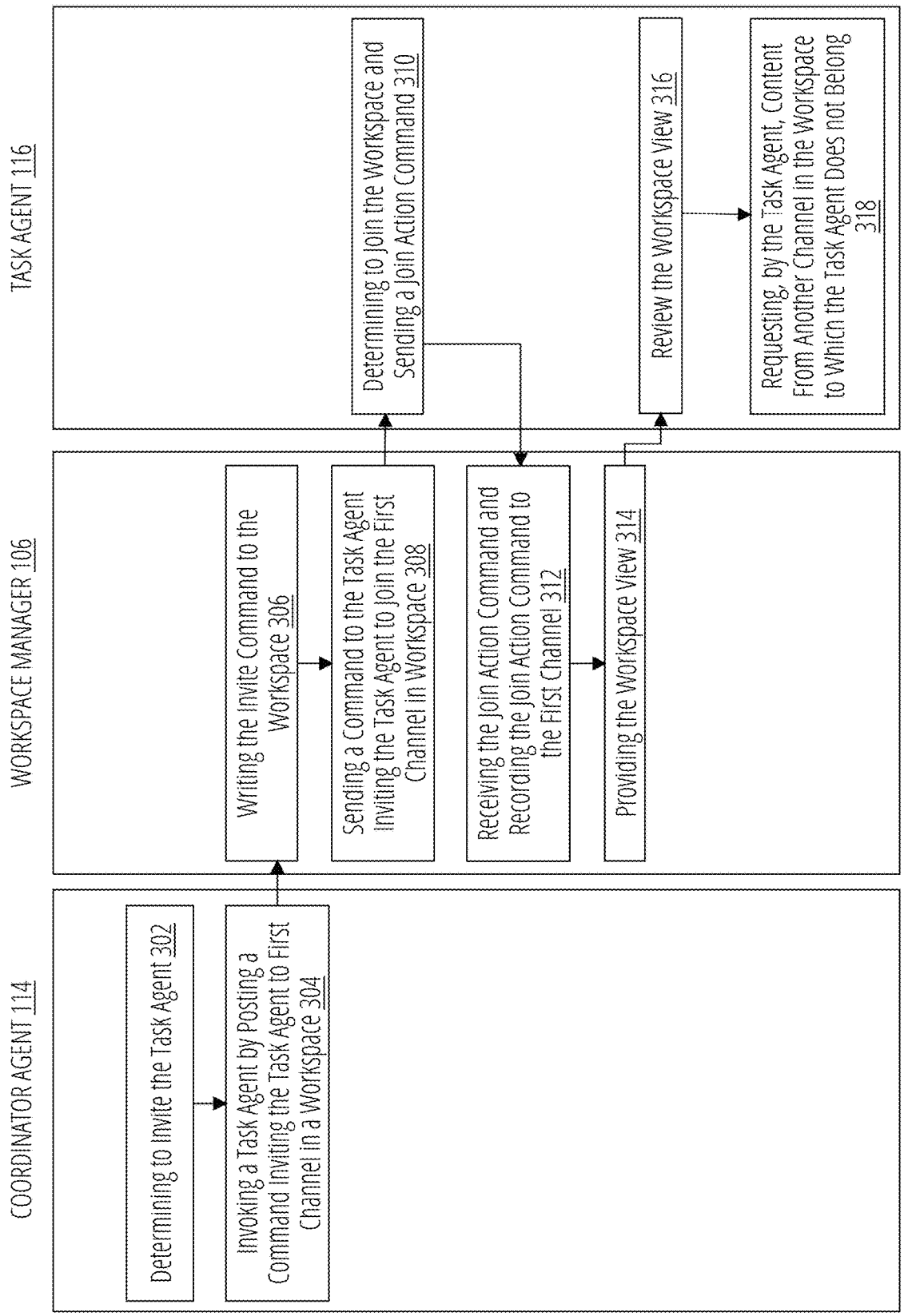
FIG. 3 illustrates an example method for joining at least two agents into a common workspace to facilitate interaction between at least two agents in accordance with in some embodiments of the present technology.

FIG. 3 illustrates an example method for joining at least two agents into a common workspace to facilitate interaction between the at least two agents in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

FIG. 3 illustrates an example in which coordinator agent 114 is in at least one channel of a workspace. As described herein, the user account or another agent in workspace 102 can post a command to workspace 102 in which coordinator agent 114 can determine how it should respond. In the interaction illustrated in FIG. 3, coordinator agent 114 determines, prompted by the command, that it should invite a task agent to workspace 102.

According to some examples, the method includes determining to invite the task agent to the workspace at block 302. For example, coordinator agent 114 illustrated in FIG. 1 may determine to invite the task agent to the workspace. In some embodiments, coordinator agent 114 has access to a list of task agents 120 within its system message, and coordinator agent 114 can be trained to make decisions on when and which task agent to bring into workspace 102 to help perform a task. In some embodiments, coordinator agent 114 can be trained to determine that a task agent should be invited to workspace 102 to help perform a task and that it should search task agents database 118 to learn of task agents that are appropriate to perform the task.

According to some examples, the method includes invoking a task agent by posting a command inviting the task agent to a first channel in a workspace at block 304. For example, coordinator agent 114 illustrated in FIG. 1 may invoke task agent 116 by posting a command inviting task agent 116 to the first channel in the workspace. In some embodiments, the command inviting the task agent includes a statement about why the task agent was invoked.

According to some examples, the method includes writing the invite command to the workspace at block 306. For example, workspace manager 106 illustrated in FIG. 1 writes the invite command to the workspace. The invite command can be posted in the channel to which the task agent was invited. The command can include a statement about why the task agent was invoked.

In addition to writing the invite command to the workspace, the method includes the workspace manager 106 illustrated in FIG. 1 sending a command to the task agent inviting the task agent to join the first channel in workspace at block 308.

According to some examples, the method includes determining to join the workspace and sending a join action command at block 310. For example, task agent 116, illustrated in FIG. 1, can join the workspace by sending a join action command. A join action command can be seen in FIG. 2C where first task agent 210 has joined the channel by posting in second channel 212.

According to some examples, the method includes receiving the join action command and recording the join action command to the first channel in response to receiving the join action command at block 312. For example, workspace manager 106 illustrated in FIG. 1 may receive and then record the join action command to the first channel. When the join action command is recorded in the first channel, the task agent is considered joined into the first channel and the workspace.

According to some examples, the method includes providing the workspace view at block 314. For example, workspace manager 106 illustrated in FIG. 1 may provide the workspace view to the task agent in response to the task agent being joined into the first channel. In some embodiments, the workspace view includes a task agent-specific view of the ledger of commands associated with the workspace. For example, since the task agent joined the first channel, the workspace view would at least include a list of commands posted in the first channel.

In some embodiments, the workspace view includes commands in channels to which the task agent belongs and configurations for the channels, and members of the channels. The workspace view may also include names and members (agents and user accounts) of other channels in the workspace to which the task agent does not belong.

According to some examples, the method includes reviewing the workspace view at block 316. For example, task agent 116 illustrated in FIG. 1 may review the workspace view and thereby the task agent learns a current state of the workspace, at least as it pertains to the task agent.

In some embodiments, an agent might not be a member of a channel for which the agent might want to learn about the contents thereof. According to some examples, the method includes requesting content from another channel in the workspace to which the task agent does not belong at block 318. For example, task agent 116 illustrated in FIG. 1 may request content from another channel in the workspace to which the task agent does not belong. While the workspace manager 106 does not proactively send commands from channels in which the task agent does not belong as part of the workspace view for the task agent, the task agent can request to see other parts of the workspace. As long as a channel in the workspace is not marked as private or is otherwise configured to prevent the task agent from viewing the workspace, workspace manager 106 will send information about other parts of the workspace. This could be helpful for example if the task agent wants context from the main channel that caused the coordinator agent to invoke the task agent.

Figure 4:
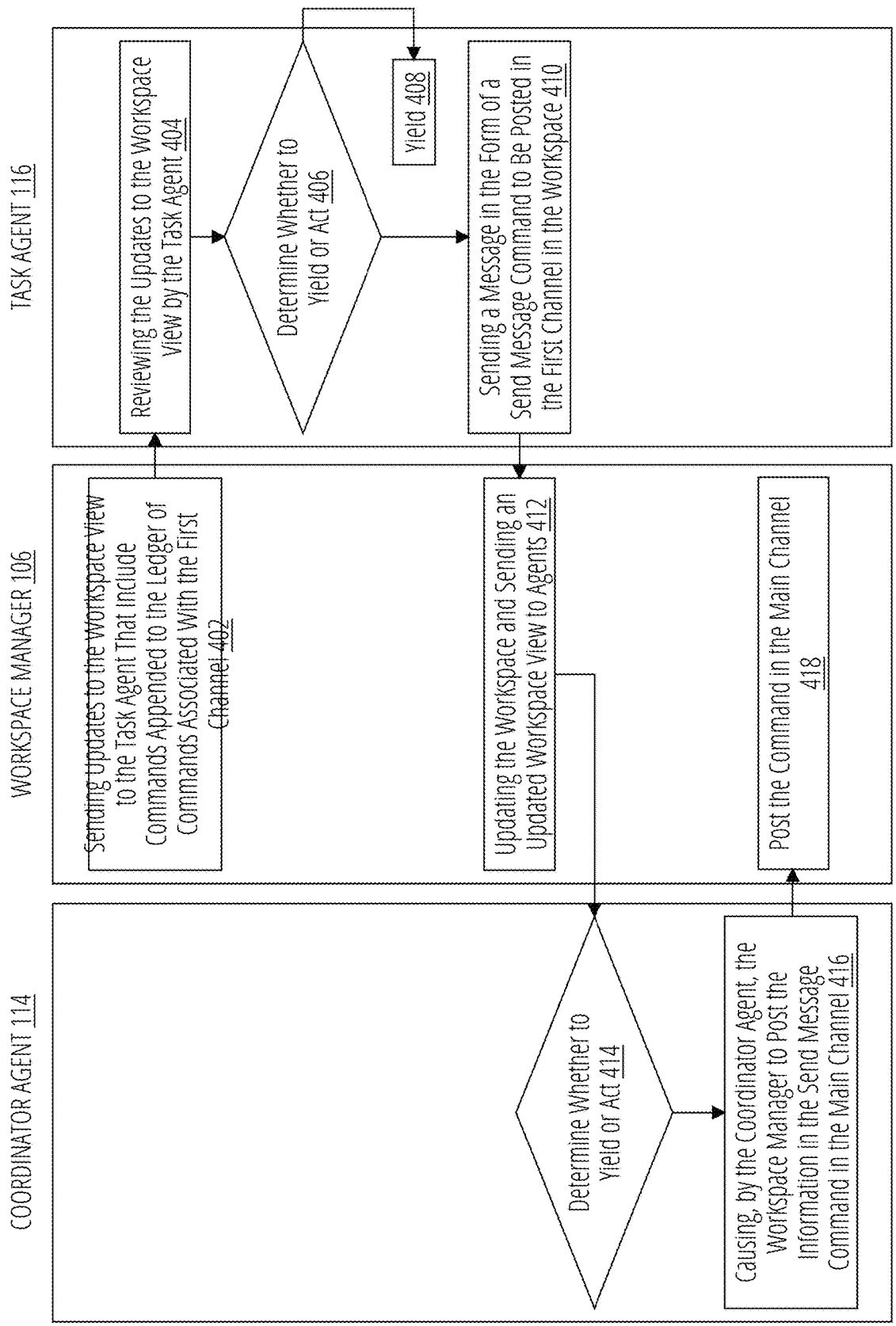
FIG. 4 illustrates an example method for reacting to updates in a workspace by the task agent and the coordinator agent in accordance with some embodiments of the present technology.

FIG. 4 illustrates an example method for reacting to updates in a workspace by the task agent and the coordinator agent in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

In FIG. 4, the task agent is joined to a channel in the workspace and, therefore, needs to participate in the channel when it is appropriate. As addressed herein, one requirement of the present technology is that any agents in a channel need to decide whether to yield or act in response to commands in channels to which the agent belongs.

According to some examples, the method includes sending updates to the workspace view of the task agent that includes commands appended to the ledger of commands associated with the first channel at block 402. For example, workspace manager 106 illustrated in FIG. 1 may send updates to the workspace view of the task agent. As new commands are included in the workspace, workspace manager 106 sends an updated workspace view when the updates are in a channel to which the task agent belongs.

According to some examples, the method includes reviewing the updates to the workspace view of the task agent at block 404. For example, task agent 116, illustrated in FIG. 1, may review the updates to the workspace view. The reviewing results in a determination by the task agent to yield or act at decision block 406. For example, task agent 116 illustrated in FIG. 1 may determine whether to yield or act.

As addressed above, there are a number of actions task agent 116 can take within the workspace, but in general task agent 116 operates in a paradigm whereby it determines to yield or act after updates to its workspace view. Task agent 116 will yield at block 408 when it determines that another agent or the user account is better suited to respond to the update.

Task agent 116 will determine that it should act when it determines that it is best suited to act in response to the update to its workspace view. For example, if the task agent is specifically configured to search the Internet, and a command appears in its workspace view to search the Internet, the task agent will choose to act. While the concept of acting could be interpreted in this instance and performing the Internet search, within the context of the present disclosure, the decision to act refers to acting within the workspace, which will generally include sending a command to the workspace. As addressed herein, acting can refer to sending a command to the channel indicating that the task agent is going to perform the Internet search, among other valid actions within the workspace.

In another example, acting can refer to sending the answer requested from the Internet search to the workspace.

Therefore, the method includes sending a command in the form of a send message command to be posted in the first channel in the workspace at block 410. For example, the workspace manager 106 illustrated in FIG. 1 may send the send message command to be posted in the first channel in the workspace, which results in posting a message in a workspace view that includes the first channel.

According to some examples, the method includes updating the workspace and sending an updated workspace view to agents block 412. For example, workspace manager 106 illustrated in FIG. 1 may update the workspace with the command and send an updated workspace view to agents.

According to some examples, the method includes determining whether to yield or act at decision block 414. For example, the coordinator agent 114 illustrated in FIG. 1 may determine whether to yield or act based on the updates to its workspace view. In some embodiments, one action that the coordinator agent might take is to post the command that the task agent placed in the workspace view into the main channel for review by the user account. For example, if the task agent posted an answer to an Internet query provided by the user account, coordinator agent 114 can determine to act by posting the command in the main channel.

According to some examples, the method includes causing the workspace manager to post the information in the main channel at block 416. For example, the coordinator agent 114 illustrated in FIG. 1 may send a command to the workspace manager to post the information in the main channel, and workspace manager 106 can post the command in the main channel at block 418.

Figure 5:
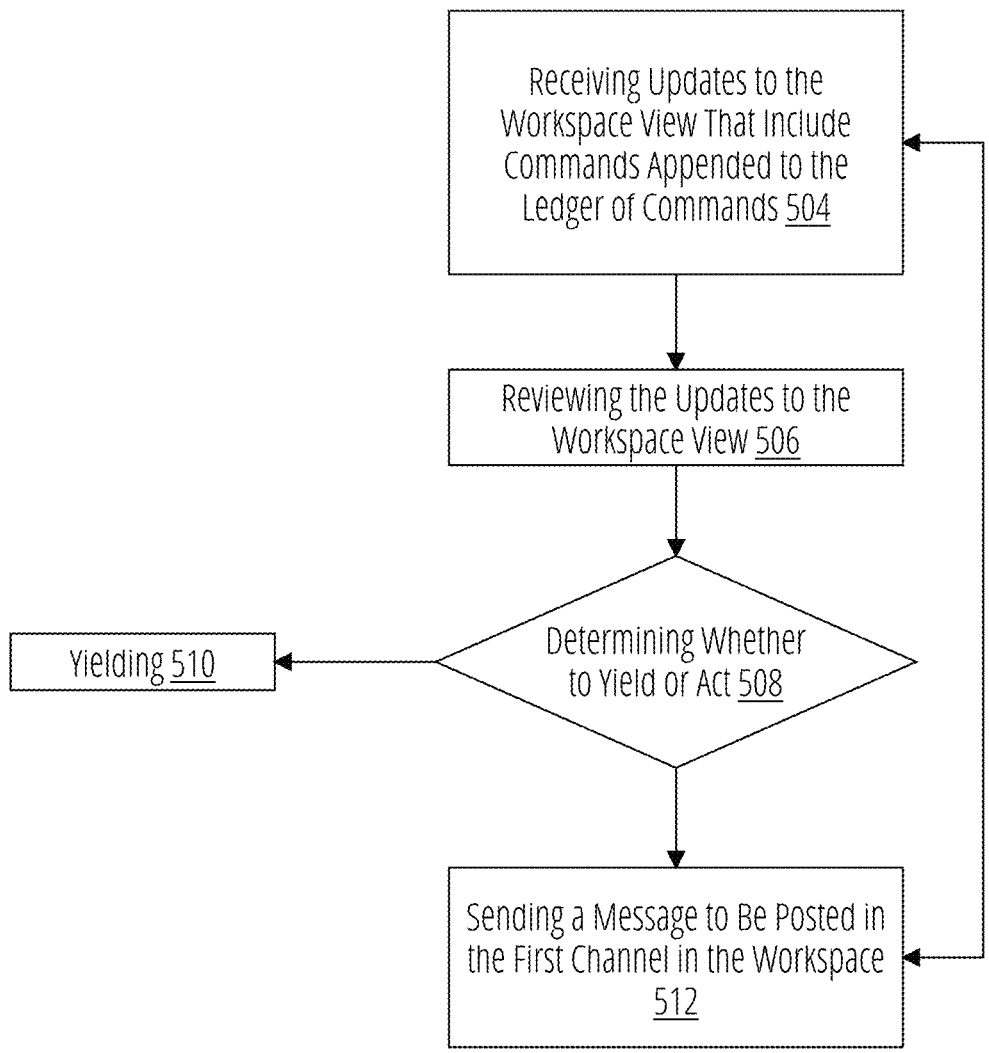
FIG. 5 illustrates an example method for reviewing commands in the workspace and determining whether to yield or act in accordance with some embodiments of the present technology.

FIG. 5 illustrates an example method for reviewing commands in the workspace and determining whether to yield or act in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As addressed herein, autonomous agents (task agents 116 and/or coordinator agent 114) in workspace 102 continually review new commands posted in workspace 102 and make a determination to yield or act. FIG. 5 illustrates this method in more detail.

According to some examples, the method includes receiving updates to the workspace view that include commands appended to the ledger of commands at block 504. For example, task agent 116 and/or coordinator agent 114 illustrated in FIG. 1 may receive updates to the workspace view that include commands appended to the ledger of commands. As described herein, the workspace view is specific to a respective member of a workspace and includes commands from the workspace that are filtered based on channels to which the member of the workspace belongs. As new commands are posted in a channel to which task agent 116 and/or coordinator agent 114 belong, workspace manager 106 can send these commands to task agent 116 and/or coordinator agent 114, and they receive these commands in at block 504.

Using the collection of commands available to task agent 116 and/or coordinator agent 114, the agent can learn the current state of the workspace. More specifically, since the workspace can include a log of operation transforms, any agent can review the list of operation transforms to reconstruct the evolution of the workspace. The agent can thereby learn the state of the workspace after each operation transform and thereby can have a current state of the workspace as of the most recent update.

According to some examples, the method includes reviewing the updates to the workspace view at block 506. For example, task agent 116 and/or coordinator agent 114, illustrated in FIG. 1, may review the updates to the workspace view. In some embodiments, the autonomous agents in workspace 102 are generative response engines, which take each update, or the entire updated workspace view as a prompt, and as such, the reviewing the updates to the workspace view at block 506 can refer to task agent 116 and/or coordinator agent 114 processing the updates to the workspace view.

According to some examples, the method includes determining whether to yield or act at decision block 508. For example, task agent 116 and/or coordinator agent 114 illustrated in FIG. 1 may determine whether to yield or act. Again referring to task agent 116 and/or coordinator agent 114 as generative response engines, the determination to yield or act at decision block 508 is the output of a response. When it is determined to yield, the response can be internal to task agent 116 and/or coordinator agent 114 and include a determine that they should not respond by yielding at block 510. In some embodiments, yielding can be achieved by not sending any command or by sending an explicit yield command.

In some embodiments, a yield command can also be a command to yield and pause the transmission of additional comments to the agent for a period, such as a few seconds.

When it is determined to act, task agent 116 and/or coordinator agent 114 can output a response where the response is in the form of a command that workspace manager 106 is configured to receive and can send the response as command to be posted in the workspace at block 512. As addressed herein, workspace 102 and workspace manager 106 can define a protocol or application programming interfaces for communicating in workspace 102. In some embodiments, the form of the command is an operation transform that can be posted in workspace 102. The operation transform can include a statement of a command and/or a command. For example, the operation transform can be a command to join/leave workspace, create/delete channel, join/leave/invite to the channel, send message, spawn/kill/die process, and yield, and when the command is to send a command, the operation transform can include content that is conversational.

Figure 6:
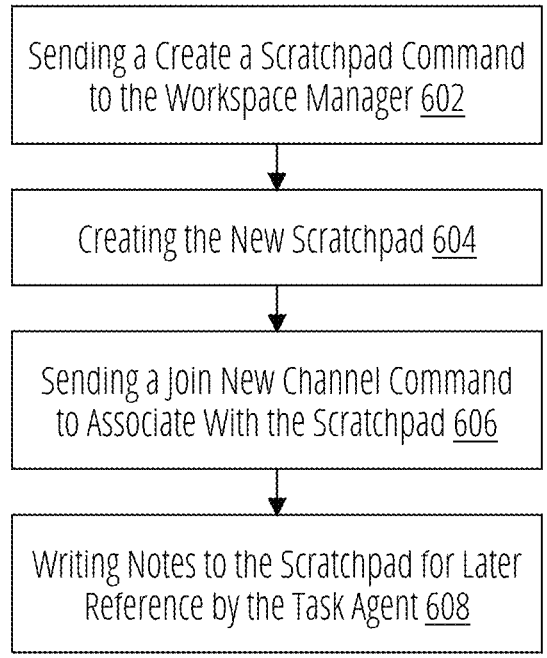
FIG. 6 illustrates an example method for creating and using a scratchpad in accordance with some embodiments of the present technology.

FIG. 6 illustrates an example for creating and using a scratchpad in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As addressed herein, it can be beneficial to allow an autonomous agent, especially a generative response engine, to utilize a scratchpad. The scratchpad can be used to write out a plan for a multi-part or long-running task, or help remember relevant context such as search results of an Internet search, or to provide a plan or coordinate future actions with other autonomous agents, etc.

According to some examples, the method includes sending a create a scratchpad command to the workspace manager at block 602. For example, task agent 116 or coordinator agent 114 illustrated in FIG. 1 may send a create a scratchpad command to the workspace manager. As addressed herein the create scratchpad command can be an operation transform.

According to some examples, the method includes creating the new scratchpad at block 604. For example, after receiving the create scratchpad command, the workspace manager 106 illustrated in FIG. 1 may create the new scratchpad in response to receiving the create scratchpad command. In some embodiments, a scratchpad has the same properties as a channel except that, sometimes, the autonomous agent that asked for the scratchpad to be created is the only member in the scratchpad channel. In some embodiments, scratchpad 112 does not need to be implemented as a channel; it is a construct to allow an agent to write, edit, or delete. In some embodiments, a scratchpad can include multiple task agents and/or the coordinator agent as members, whereby the scratchpad can be used to coordinate potential future actions of the multiple task agents and/or the coordinator agent.

While a scratchpad might include notes about possible future actions, it should be noted that this does not change the yield or act paradigm addressed herein (e.g., such as with respect to FIG. 5). In other words, even if a scratchpad includes a note that a task agent should perform a future task (e.g., in a sequence of tasks), the task agent needs to decide to act when it is time to perform the task. The notes in the scratchpad can provide context to the determination by the task agent of whether to yield or act, but the scratchpad is not determinative of the yield or act decision.

According to some examples, the method includes sending a join new channel command to associate with the scratchpad at block 606. For example, task agent 116 or coordinator agent 114 illustrated in FIG. 1 may send a join new channel command to associate with the scratchpad.

According to some examples, the method includes writing notes to the scratchpad for later reference at block 608. For example, task agent 116 or coordinator agent 114, illustrated in FIG. 1, may write notes on the scratchpad for later reference.

The scratchpad 112 is append-only just like the rest of workspace 102. However, writes to scratchpad 112 might include line numbers for simple reference. Task agent 116 or coordinator agent 114 can write to the scratchpad using the following commands:

append(text) or append(line_num)—to add new content to scratchpad 112.

delete(text) or delete(line_num)—to delete a note at a previous line number. While the command suggest something is to be deleted from the append-only workspace, this command can be processed by any agent looking at their workspace view to delete the text at the designated line number. Accordingly, the content at the line number in the workspace remains, but an agent viewing the workspace will understand that the content at the designated line number has been deleted in their workspace view.

edit(line_num, text)—just like the delete command this command does not actually edit content at a prior line number. Rather the agent viewing the workspace will understand that this command serves to edit the content in their workspace view.

insert(text, line_num)—The insert text command does not change existing line numbers but does cause an agent viewing the workspace to construct a view of the workspace with the line number inserted.

summarize_into_latent(text) OR summarize_into_latent (from_line, to_line)—These commands summarize commands in the scratchpad into a latent representation that might be a more efficient input for the autonomous agent.

clear_scratchpad( . . . )—This command can be used to delete the scratch pad, which can be similar to closing a channel in the workspace.

push_to_disk( . . . )—This command can be used to save the scratchpad to a persistent storage.

load_from_disk( . . . )—This command can be used to load the scratchpad into memory from a persistent storage.

spawn_scratchpad( . . . )—This command can be used to create the scratchpad or create a new scratchpad.

copy_paste( . . . )—This command can be used to copy something from the scratchpad into another channel or to paste something from another channel into the scratchpad.

Figure 7:
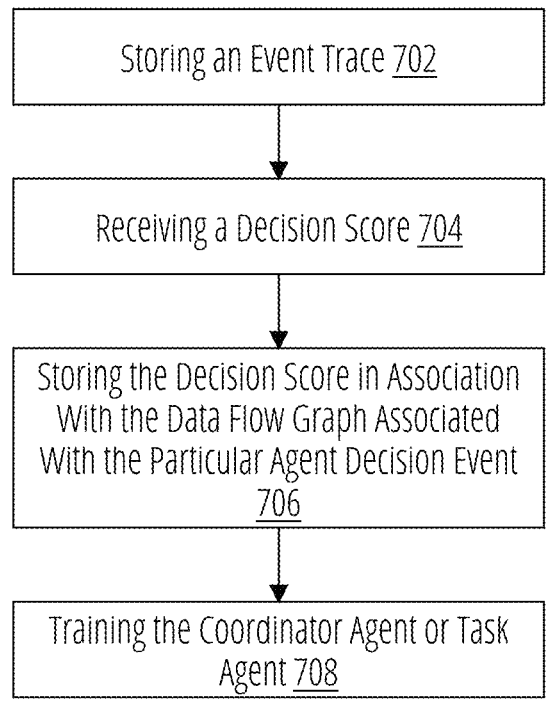
FIG. 7 illustrates an example method for generating training data in accordance with some embodiments of the present technology.

FIG. 7 illustrates an example method for generating training data in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

As new task agents 116 are developed, there is a need to repeatedly train coordinator agent 114 to decide to invite task agents that can do a good job with the task for which they are invoked. And, in general, there is a need to repeatedly train coordinator agent 114 to make better decisions and adapt to new use cases. Additionally, providers of task agents will also want to repeatedly train respective task agents to perform better for the tasks they are designed to do. It is easy to imagine a future where different providers might have respective task agents competing to be invoked for the same tasks, so the task agent that performs best, according to the coordinator agent 114 is likely to get invoked more often.

Training data is needed to train a task agent or the coordinator agent. In particular, the training data should include one or more events or commands occurring in the workspace, leading to an outcome that can be graded and used for training.

According to some examples, the method includes storing an event trace at block 702. For example, the trace service 104 illustrated in FIG. 1 conducts an event trace and stores the event trace. An event trace is a data flow graph associated with a particular agent (coordinator agent or task agent) decision event. The data flow graph identifies related decision events leading up to and after the particular agent decision event. The data flow graph can record which functions were called, with which arguments, and at what time, as well as other key relationships between functions (e.g., which functions called another, how did the data flow, which function results were visible to other concurrent calls using vector clocks.

According to some examples, the method includes receiving a decision score at block 704. For example, the review of actions service 108 illustrated in FIG. 1 may receive a decision score. The decision score can indicate the quality of an outcome resulting from the particular agent decision event. The review actions service can observe the outcome and score its quality. In some embodiments, the quality of the outcome can be determined by subsequent user account actions. If the user account ends their session or at least moves on to another topic, this can indicate that the user account was satisfied with the outcome. But if the user account attempted to rephrase or refine their prompt for the initial task, or attempted to request refinement in the output the user account received, this can indicate that the outcome was not completely satisfactory. In some embodiments, review actions service can be a service configured to receive scores provided by human reviews.

According to some examples, the method includes storing the decision score in association with the data flow graph associated with the particular agent decision event at block 706. For example, the training data database 132 illustrated in FIG. 1 may store the decision score in association with the data flow graph associated with the particular agent decision event.

According to some examples, the method includes training the coordinator agent or task agent at block 708. For example, the model training service 1114 illustrated in FIG. 11 may train the coordinator agent or task agent.

In some embodiments, the coordinator agent is trained to select a task agent or search for another agent. Reinforcement learning can be used whereby the coordinator agent will occasionally try different agents to see if better outcomes are obtainable from different agents. The data from the training data database 132 can be used to train the coordinator agent.

Likewise, even third parties that create a task agent might obtain training data from training data database 132 for further training of their task agents.

Figure 8A:
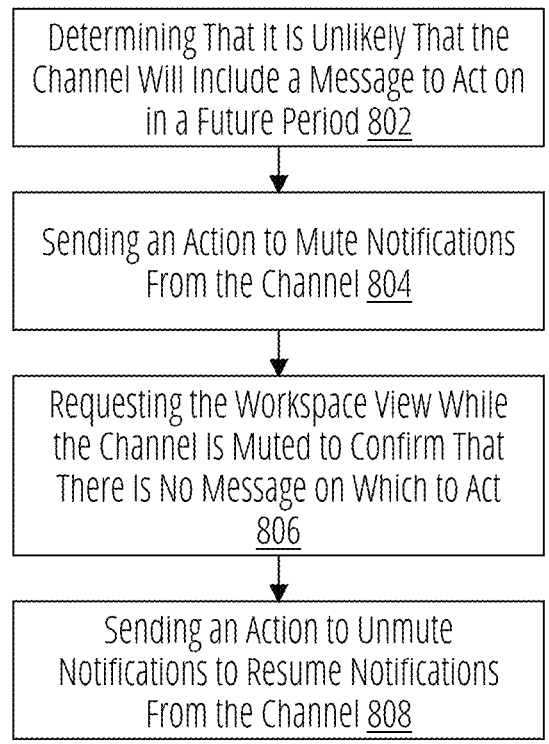
FIG. 8A and FIG. 8B illustrates example methods for temporarily muting notifications from the workspace in accordance with some embodiments of the present technology.
Figure 8B:
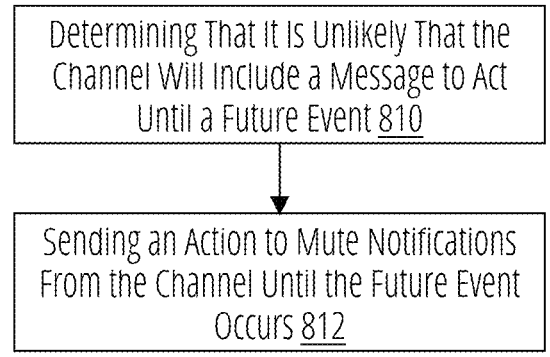

FIG. 8A and FIG. 8B illustrates example methods for temporarily muting notifications from the workspace in accordance with some embodiments of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

Sometimes the coordinator agent or the task agent in a workspace will not be needed for a period of time, and in such instances, it can be helpful to pause sending notifications to the respective agent during this time to avoid the agent from needing to waste computing resources determining to yield or act in response to each command. In FIG. 8A, coordinator agent 114 can determine that notifications to task agent 116 should be temporarily muted (discontinue pushing notifications to task agent 116).

According to some examples, the method includes determining that it is unlikely that the channel will include a message for task agent 116 to act on in a future period at block 802. For example, the coordinator agent 114 illustrated in FIG. 1 may determine that it is unlikely that the channel will include a message for task agent 116 to act on in a future period. For example, coordinator agent 114 might be aware of a long running task by another task agent and that task agent 116 won't have anything to act on until the another task agent has finished its task.

According to some examples, the method includes sending an action to mute notifications from the channel (for a specified future period or indefinitely) at block 804. For example, the coordinator agent 114 illustrated in FIG. 1 may send an action to mute notifications from the channel to task agent 116. However, the command muting notifications to the task agent 116 is sent to task agent 116 so that task agent 116 is informed that it is still in workspace 102, but that notifications will not be pushed to task agent 116 for a period.

Even though task agent 116 is not receiving pushed commands, it might want to check in on the status of workspace 102, which it can do by requesting a refreshed workspace view 122. According to some examples, the method includes requesting the workspace view while the channel is muted to confirm that there is no message on which to act at block 806. For example, task agent 116, illustrated in FIG. 1, may request the workspace view while the channel is muted to confirm that there is no message on which to act.

According to some examples, the method includes sending an action to unmute notifications to resume notifications from the channel at block 808. For example, the coordinator agent 114 illustrated in FIG. 1 may send an action to unmute notifications to resume notifications from the channel being pushed to task agent 116.

In FIG. 8B, coordinator agent 114 or task agent 116 can make its own determination that its notifications should be muted (no longer pushed).

According to some examples, the method includes determining that it is unlikely that the channel will include a message to act until a future event at block 810. For example, the coordinator agent 114 or task agent 116 illustrated in FIG. 1 may determine that it is unlikely that the channel will include a message for it to act on until a future event.

According to some examples, the method includes sending an action to mute notifications from the channel until a future event occurs at block 812. For example, coordinator agent 114 or task agent 116 illustrated in FIG. 1 may send an action to mute notifications from the channel until the future event occurs. In some embodiments, the future event can be that other agents are added or returned to a channel, or that a period of time has passed.

In some embodiments, coordinator agent 114 or task agent 116 can provide exceptions to the request to not receive workspace view updates until a later event. For example, coordinator agent 114 or task agent 116 can allow a notification to be pushed to them when they are specifically referenced in the workspace (similar to an @meantion).

Figure 9:
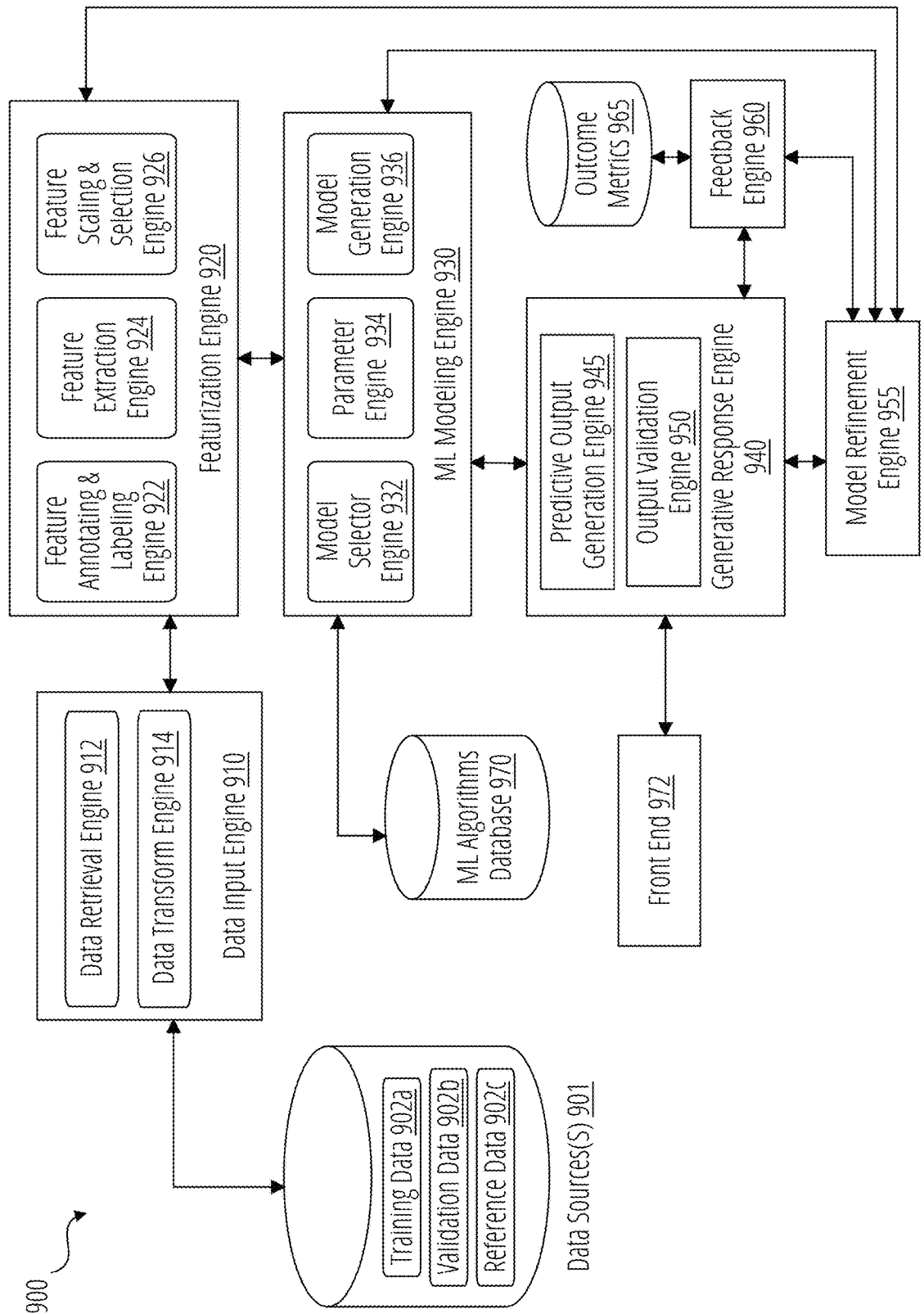
FIG. 9 is a block diagram illustrating an exemplary machine learning platform for implementing various aspects of this disclosure in accordance with some embodiments of the present technology.
Figure 10:
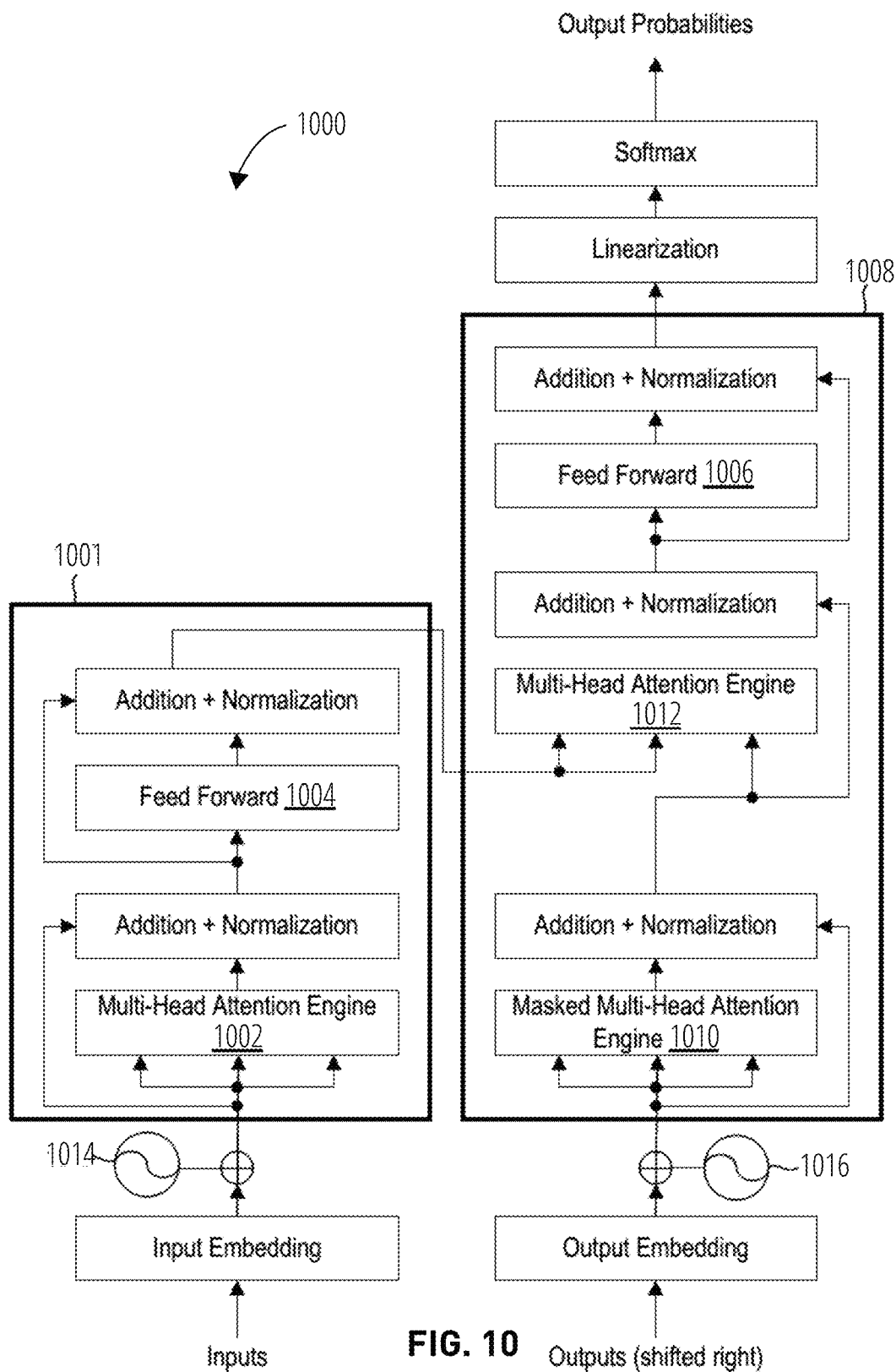
FIG. 10 is a block diagram of an example transformer in accordance with some aspects of the disclosure.

FIG. 9 is a block diagram illustrating an example machine learning platform for implementing various aspects of this disclosure in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 900 may include data input engine 910 that can further include data retrieval engine 912 and data transform engine 914. Data retrieval engine 912 may be configured to access, interpret, request, or receive data, which may be adjusted, reformatted, or changed (e.g., to be interpretable by another engine, such as data input engine 910). For example, data retrieval engine 912 may request data from a remote source using an API. Data input engine 910 may be configured to access, interpret, request, format, re-format, or receive input data from data sources(s) 901. For example, data input engine 910 may be configured to use data transform engine 914 to execute a re-configuration or other change to data, such as a data dimension reduction. In some embodiments, data sources(s) 901 may be associated with a single entity (e.g., organization) or with multiple entities. Data sources(s) 901 may include one or more of training data 902a (e.g., input data to feed a machine learning model as part of one or more training processes), validation data 902b (e.g., data against which at least one processor may compare model output with, such as to determine model output quality), and/or reference data 902c. In some embodiments, data input engine 910 can be implemented using at least one computing device. For example, data from data sources(s) 901 can be obtained through one or more I/O devices and/or network interfaces. Further, the data may be stored (e.g., during execution of one or more operations) in a suitable storage or system memory. Data input engine 910 may also be configured to interact with a data storage, which may be implemented on a computing device that stores data in storage or system memory.

System 900 may include featurization engine 920. Featurization engine 920 may include feature annotating & labeling engine 922 (e.g., configured to annotate or label features from a model or data, which may be extracted by feature extraction engine 924), feature extraction engine 924 (e.g., configured to extract one or more features from a model or data), and/or feature scaling & selection engine 926 Feature scaling & selection engine 926 may be configured to determine, select, limit, constrain, concatenate, or define features (e.g., AI features) for use with AI models.

System 900 may also include machine learning (ML) ML modeling engine 930, which may be configured to execute one or more operations on a machine learning model (e.g., model training, model re-configuration, model validation, model testing), such as those described in the processes described herein. For example, ML modeling engine 930 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 902a) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 930 may include model selector engine 932 (e.g., configured to select a model from among a plurality of models, such as based on input data), parameter engine 934 (e.g., configured to add, remove, and/or change one or more parameters of a model), and/or model generation engine 936 (e.g., configured to generate one or more machine learning models, such as according to model input data, model output data, comparison data, and/or validation data).

In some embodiments, model selector engine 932 may be configured to receive input and/or transmit output to ML algorithms database 970. Similarly, featurization engine 920 can utilize storage or system memory for storing data and can utilize one or more I/O devices or network interfaces for transmitting or receiving data. ML algorithms database 970 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Two specific examples of machine learning models that can be stored in the ML algorithms database 970 include versions DALL-E and CHAT GPT, both provided by OPEN AI.

System 900 can further include generative response engine 940 that is made up of a predictive output generation engine 945, output validation engine 950 (e.g., configured to apply validation data to machine learning model output). Predictive output generation engine 945 can be configured to receive inputs from front end 972 that provide some guidance as to a desired output. Front end 972 can be a graphical user interface where a user can provide natural language prompts and receive responses from generative response engine 940. Front end 172 can also be an application programming interface (API) which other applications can call by providing a prompt and can receive responses from generative response engine 140. Predictive output generation engine 945 can analyze the input and identify relevant patterns and associations in the data it has learned to generate a sequence of words that predictive output generation engine 945 predicts is the most likely continuation of the input using one or more models from the ML algorithms database 970, aiming to provide a coherent and contextually relevant answer. Predictive output generation engine 945 generates responses by sampling from the probability distribution of possible words and sequences, guided by the patterns observed during its training. In some embodiments, predictive output generation engine 945 can generate multiple possible responses before presenting the final one. Predictive output generation engine 945 can generate multiple responses based on the input, and these responses are variations that predictive output generation engine 945 considers potentially relevant and coherent. Output validation engine 950 can evaluate these generated responses based on certain criteria. These criteria can include relevance to the prompt, coherence, fluency, and sometimes adherence to specific guidelines or rules, depending on the application. Based on this evaluation, output validation engine 950 selects the most appropriate response. This selection is typically the one that scores highest on the set criteria, balancing factors like relevance, informativeness, and coherence.

System 900 can further include feedback engine 960 (e.g., configured to apply feedback from a user and/or machine to a model) and model refinement engine 955 (e.g., configured to update or re-configure a model). In some embodiments, feedback engine 960 may receive input and/or transmit output (e.g., output from a trained, partially trained, or untrained model) to outcome metrics database 965. Outcome metrics database 965 may be configured to store output from one or more models and may also be configured to associate output with one or more models. In some embodiments, outcome metrics database 965, or other device (e.g., model refinement engine 955 or feedback engine 960), may be configured to correlate output, detect trends in output data, and/or infer a change to input or model parameters to cause a particular model output or type of model output. In some embodiments, model refinement engine 955 may receive output from predictive output generation engine 945 or output validation engine 950. In some embodiments, model refinement engine 955 may transmit the received output to featurization engine 920 or ML modeling engine 930 in one or more iterative cycles.

The engines of system 900 may be packaged functional hardware units designed for use with other components or a part of a program that performs a particular function (e.g., of related functions). Any or each of these modules may be implemented using a computing device. In some embodiments, the functionality of system 900 may be split across multiple computing devices to allow for distributed processing of the data, which may improve output speed and reduce computational load on individual devices. In some embodiments, system 900 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 900 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

The system 900 may include various types of ML models, such as a transformer. A transformer is a neural network architecture built into natural language processing (NLP) tasks, such as language translation, sentiment analysis, and text summarization. Conventional traditional recurrent neural networks (RNNs) process data in sequence, which slows the operations and training. A transformer or transformer network can process input in parallel and is faster and more efficient than sequential training and processing. In some aspects, transformers use a self-attention mechanism, which allows a transformer to identify the most relevant parts of the input text or content (e.g., audio or video). In some cases, transformers can also use a cross-attention mechanism which uses other content or data to determine the most relevant parts of the input. For example, cross-attention mechanisms are useful in sequential content such as a stream of data, such as optical flow, and other computer vision techniques.

A transformer model includes a multi-layer encoder-decoder architecture. The encoder takes the input text, converts the input text into a sequence of hidden representations and captures the meaning of the text at different levels of abstraction. The decoder then uses these representations to generate an output sequence, such as a text translation or a summary. The encoder and decoder are trained together using a combination of supervised and unsupervised learning techniques, such as maximum likelihood estimation and self-supervised pretraining. Illustrative examples of transformer engines include a Bidirectional Encoder Representations from Transformers (BERT) model, a Text-to-Text Transfer Transformer (T5), biomedical BERT (BioBERT), scientific BERT (SciBERT), and the SPECTER model for document-level representation learning. In some aspects, multiple transformer engines may be used to generate different embeddings.

An embedding is a representation of a discrete object, such as a word, a document, or an image, as a continuous vector in a multi-dimensional space. An embedding captures the semantic or structural relationships between the objects, such that similar objects are mapped to nearby vectors, and dissimilar objects are mapped to distant vectors. Embeddings are commonly used in machine learning, computer vision, and natural language processing tasks, such as language modeling, sentiment analysis, and machine translation. Embeddings are typically learned from large corpora of data using unsupervised learning algorithms, such as word2vec, GloVe, or fastText, which optimize the embeddings based on the co-occurrence or context of the objects in the data. Once learned, embeddings can be used to improve the performance of downstream tasks by providing a more meaningful and compact representation of the objects.

In some aspects, a generative response engine can be used in conjunction with supplemental models, such as a generator and a discriminator, which together form a GAN. A generator model generates data samples that resemble the distribution of a given dataset. For example, the generator takes random noise as input and transforms the noise into data samples that are indistinguishable from real data. The generator learns to produce realistic samples through training, often using techniques such as backpropagation and gradient descent, and is used for various applications, including image synthesis, text generation, and data augmentation. A discriminator is configured to distinguish between real data samples and fake or generated data samples produced by the generator. The discriminator learns to differentiate between real and generated data, providing feedback to the generator. In some cases, a discriminator can be trained in different contexts to differentiate between different safe and unsafe content.

In some aspects, the predictive output generation engine 945 may be executed using a neural engine for on-device execution. A neural engine that includes a plurality of neural processing cores that are configured to parallelize operations associated with neural networks. A neural processing core includes arrays of multiply-accumulate (MAC) units and specialized instructions that are optimized for matrix operations, such as convolution and matrix multiplication. A neural processing core receives input data and performs matrix transformations and nonlinear activation functions to break down and parallelize matrix operations. The neural processing core is configured to perform tasks such as inference (e.g., runtime operation of an ML model) or training of deep learning models and accelerates tasks by parallelization of larger computations that can be performed in parallel (e.g., matrix operations associated with neural networks). For example, a neural engine may perform computer vision tasks such as object recognition. In some cases, the neural engine can be implemented based on various ML libraries such as PyTorch, which interfaces with the compute unified device architecture (CUDA) to parallelize operations.

In one example, the predictive output generation engine 945 may be a small generative model that has fewer parameters, fewer layers, fewer neurons, or a simpler architecture compared to larger models. A small generative model may not capture the full complexity of the underlying data distribution as effectively as larger models but can still be useful in scenarios where computational resources are limited or where a simpler model is sufficient for the task. Small generative models can also be easier to train and interpret, making them suitable for certain applications. For example, ChatGPT-3.5 has 175 billion parameters and would result in a size of 1.4 Terabytes (TB) for a model implemented with double-precision floating point numbers. A smaller model may have a simpler architecture, use fewer parameters (e.g., 10 million), and use less precise numbers (e.g., single-precision floating point numbers) resulting in a size of 38 Megabytes (MB).

In addition, small models benefit from increased training based on local execution and data specific to a local device and a user of that local device. An additional benefit to small models is increased privacy because information is not transmitted over the network and only relies on information requested by the user or usage at the local device.

In a convolutional neural network (CNN) model, the number of operations required to relate signals from two arbitrary input or output positions grows in the distance between positions, which makes learning dependencies at different distant positions challenging for a CNN model. Transformer 1000 reduces the operations of learning dependencies by using encoder 1001 and decoder 1008 that implements an attention mechanism at different positions of a single sequence to compute a representation of that sequence. An attention function can be described as mapping a query and a set of key-value pairs to an output, where the query, keys, values, and output are all vectors. The output is computed as a weighted sum of the values, where the weight assigned to each value is computed by a compatibility function of the query with the corresponding key.

In one example of a transformer, encoder 1001 is composed of a stack of six identical layers and each layer has two sub-layers. The first sub-layer is multi-head self-attention engine 1002, and the second sub-layer is a fully connected feed-forward network 1004. A residual connection (not shown) connects around each of the sub-layers followed by normalization.

In this example of Transformer 1000, decoder 1008 is also composed of a stack of six 6 identical layers. The decoder also includes masked multi-head self-attention engine 1010, multi-head attention engine 1012 over the output of encoder 1001, and fully connected feed-forward network 1006. Each layer includes a residual connection (not shown) around the layer, which is followed by layer normalization. Masked multi-head self-attention engine 1010 is masked to prevent positions from attending to subsequent positions and ensures that the predictions at position i can depend only on the known outputs at positions less than i (e.g., auto-regression).

In the transformer, the queries, keys, and values are linearly projected by a multi-head attention engine into learned linear projects, and then attention is performed in parallel on each of the learned linear projects, which are concatenated and then projected into final values.

The transformer also includes positional encoder 1014 to encode positions because the model does not contain recurrence and convolution and relative or absolute position of the tokens is needed. In Transformer 1000, the positional encodings are added to the input embeddings at the bottom layer of encoder 1001 and decoder 1008. The positional encodings are summed with the embeddings because the positional encodings and embeddings have the same dimensions. A corresponding position decoder 1016 is configured to decode the positions of the embeddings for decoder 1008.

In some aspects, Transformer 1000 uses self-attention mechanisms to selectively weigh the importance of different parts of an input sequence during processing and allows the model to attend to different parts of the input sequence while generating the output. The input sequence is first embedded into vectors and then passed through multiple layers of self-attention and feed-forward networks. Transformer 1000 can process input sequences of variable length, making it well-suited for natural language processing tasks where input lengths can vary greatly. Additionally, the self-attention mechanism allows Transformer 1000 to capture long-range dependencies between words in the input sequence, which is difficult for RNNs and CNNs. The transformer with self-attention has achieved results in several natural language processing tasks that are beyond the capabilities of other neural networks and has become a popular choice for language and text applications. For example, the various large language models, such as a generative pretrained transformer (e.g., ChatGPT, etc.) and other current models are types of transformer networks.

Figure 11:
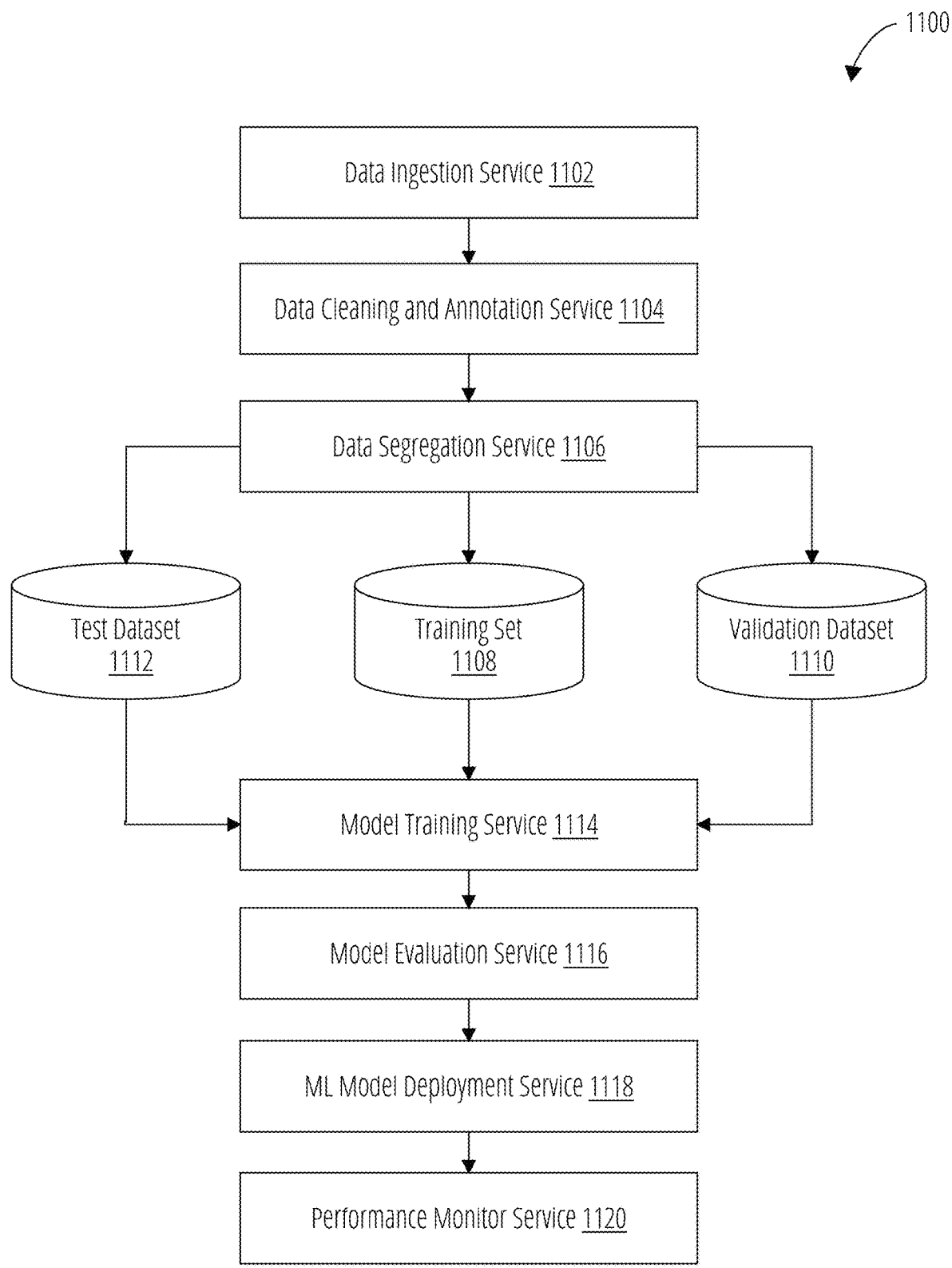
FIG. 11 illustrates an example lifecycle of an ML model in accordance with some embodiments of the present technology.

FIG. 11 illustrates an example lifecycle of a ML model in accordance with some embodiments of the present technology. The first stage of the lifecycle 1100 of a ML model is a data ingestion service 1102 to generate datasets described below. ML models require a significant amount of data for the various processes described in FIG. 11 and the data persisted without undertaking any transformation to have an immutable record of the original dataset. The data can be provided from third party sources such as publicly available dedicated datasets. The data ingestion service 1102 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 1102 retrieves the data. In some examples, the data ingestion service 1102 may be online and the data is streamed from the producer in real-time for storage in the data ingestion service 1102.

After data ingestion service 1102, a data preprocessing service preprocesses the data to prepare the data for use in the lifecycle 1100 and includes at least data cleaning, data transformation, and data selection operations. The data cleaning and annotation service 1104 removes irrelevant data (data cleaning) and general preprocessing to transform the data into a usable form. The data cleaning and annotation service 1104 includes labelling of features relevant to the ML model. In some examples, the data cleaning and annotation service 1104 may be a semi-supervised process performed by a ML to clean and annotate data that is complemented with manual operations such as labeling of error scenarios, identification of untrained features, etc.

After the data cleaning and annotation service 1104, data segregation service 1106 to separate data into at least a training set 1108, a validation dataset 1110, and a test dataset 1112. Each of the training set 1108, a validation dataset 1110, and a test dataset 1112 are distinct and do not include any common data to ensure that evaluation of the ML model is isolated from the training of the ML model.

The training set 1108 is provided to a model training service 1114 that uses a supervisor to perform the training, or the initial fitting of parameters (e.g., weights of connections between neurons in artificial neural networks) of the ML model. The model training service 1114 trains the ML model based a gradient descent or stochastic gradient descent to fit the ML model based on an input vector (or scalar) and a corresponding output vector (or scalar).

After training, the ML model is evaluated at a model evaluation service 1116 using data from the validation dataset 1110 and different evaluators to tune the hyperparameters of the ML model. The predictive performance of the ML model is evaluated based on predictions on the validation dataset 1110 and iteratively tunes the hyperparameters based on the different evaluators until a best fit for the ML model is identified. After the best fit is identified, the test dataset 1112, or holdout data set, is used as a final check to perform an unbiased measurement on the performance of the final ML model by the model evaluation service 1116. In some cases, the final dataset that is used for the final unbiased measurement can be referred to as the validation dataset and the dataset used for hyperparameter tuning can be referred to as the test dataset.

After the ML model has been evaluated by the model evaluation service 1116, an ML model deployment service 1118 can deploy the ML model into an application or a suitable device. The deployment can be into a further test environment such as a simulation environment, or into another controlled environment to further test the ML model.

After deployment by the ML model deployment service 1118, a performance monitor service 1120 monitors for performance of the ML model. In some cases, the performance monitor service 1120 can also record additional transaction data that can be ingested via the data ingestion service 1102 to provide further data, additional scenarios, and further enhance the training of ML models.

Figure 12:
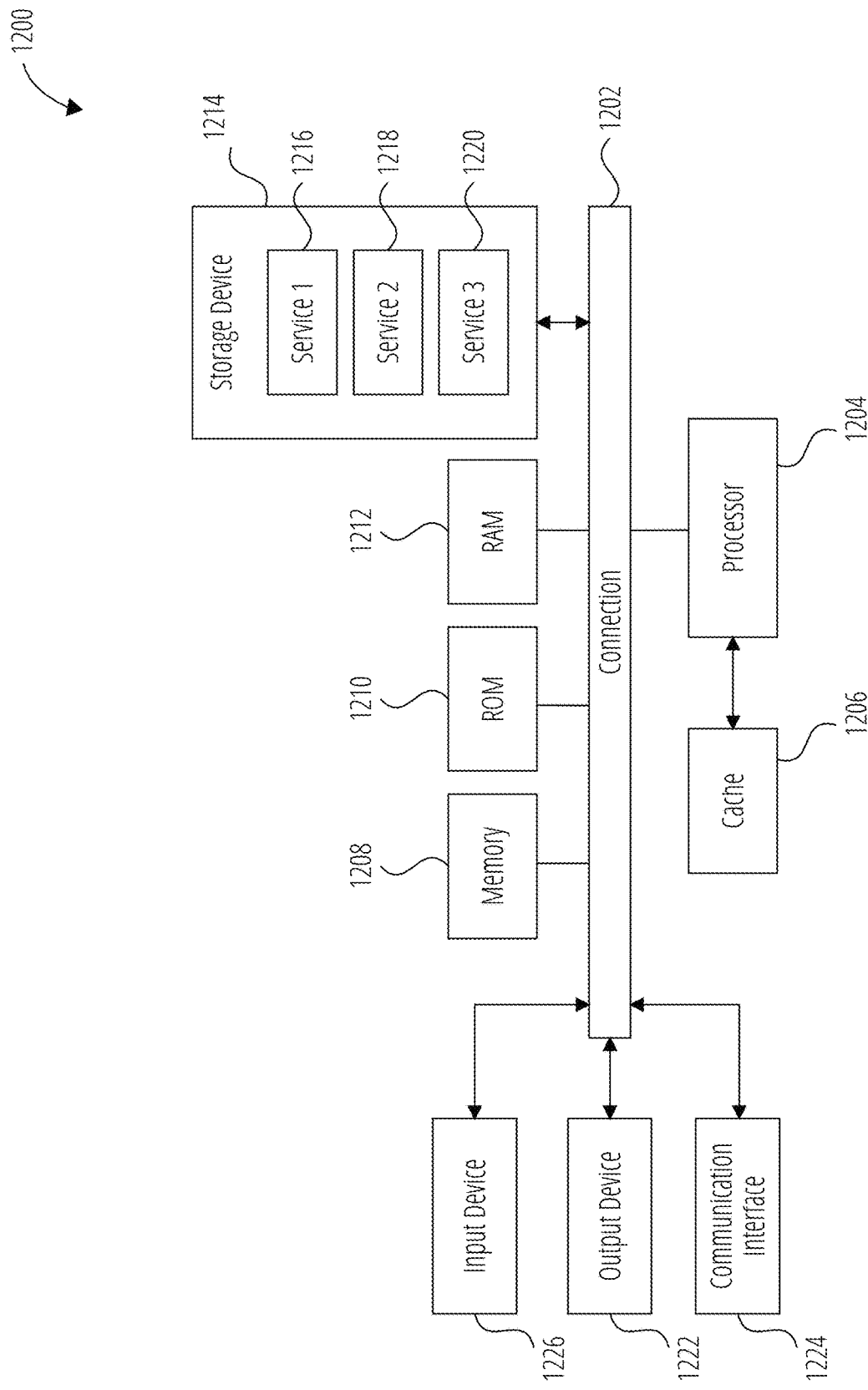
FIG. 12 shows an example of a system for implementing certain aspects of the present technology.

FIG. 12 shows an example of computing system 1200, which can be, for example, any computing device making up any engine illustrated in FIG. 1 or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Computing system 1200 can include a cache of high-speed memory 1206 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1214 can include software services, servers, services, etc., that when the code that defines such software is executed by the processor 1204, it causes the system to perform a function. In some embodiments, a hardware service that performs a particular function can include the software component stored in a computer-readable medium in connection with the necessary hardware components, such as processor 1204, connection 1202, output device 1222, etc., to carry out the function.

For clarity of explanation, in some instances, the present technology may be presented as including individual functional blocks including functional blocks comprising devices, device components, steps or methods in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Aspect 1. A method comprising: joining at least two autonomous agents in a workspace, wherein the workspace is a ledger of commands and commands, the at least two autonomous agents are configured to determine whether to yield or act after a command is added to the workspace; receiving from a first agent of the at least two autonomous agents, a first command to be added to the workspace; sending the first command to a second agent of the at least two autonomous agents; and receiving, in response to the first command, a second command to post in the workspace, the second command indicates a determination by the second agent to act in response to the first command.

Aspect 2. The method of aspect 1, further comprising: receiving, by a workspace manager, an instruction to invoke a task agent from a coordinator agent by posting a command inviting the task agent to a first channel in the workspace, wherein the first agent is the coordinator agent and the second agent is the task agent.

Aspect 3. The method of any one of aspects 1-2, further comprising: sending a command, by the workspace manager, to the task agent inviting the task agent to join the first channel in the workspace; receiving, by the workspace manager, a join action command, from the task agent, to be posted in the first channel; and recording, by the workspace manager the join action command to the first channel in response to receiving the join action command, when the join action command is recorded in the first channel the task agent is joined into the first channel.

Aspect 4. The method of any one of aspects 1-3, further comprising: providing, by the workspace manager, a workspace view to the task agent, wherein the workspace view includes the ledger of commands filtered for channels to which the task agent has joined, including the first channel in the workspace.

Aspect 5. The method of any one of aspects 1-4, further comprising: sending, by the workspace manager, updates to the workspace view to the task agent that include commands appended to the ledger of commands associated with the first channel; and reviewing the updates to the workspace view by the task agent, wherein the reviewing results in a determination by the task agent to yield.

Aspect 6. The method of any one of aspects 1-5, wherein the workspace includes a main channel that includes the coordinator agent and a user account.

Aspect 7. The method of any one of aspects 1-6, further comprising: sending, by the task agent, a create a scratchpad command to the workspace manager; creating, a scratchpad by the workspace manager; sending, by the task agent, a join new channel command to associate with the scratchpad; and writing, by the task agent, notes to the scratchpad for later reference by the task agent.

Aspect 8. The method of any one of aspects 1-7, wherein the workspace manager manages permissions for the main channel and the first channel.

Aspect 9. The method of any one of aspects 1-8, wherein the commands included in the workspace are written as operation transforms.

Aspect 10. The method of any one of aspects 1-9, further comprising: prior to the invoking the task agent, determining, by the coordinator agent to invite the task agent.

Aspect 11. The method of any one of aspects 1-10, further comprising: storing, by a trace service, an event trace, wherein the event trace is a data flow graph associated with a particular agent decision event, wherein the data flow graph identifies related decision events leading up to and after the particular agent decision event; and receiving, from a review actions service a decision score indicating a quality of an outcome resulting from the particular agent decision event, wherein the review actions service can observe the outcome and score the quality of the outcome, whereby the decision score can be stored in association with the data flow graph associated with the particular agent decision event; wherein the coordinator agent is trained to select the task agent or search for the another agent using reinforcement learning from the data flow graph and the associated decision score.

Aspect 12. The method of any one of aspects 1-11, further comprising: determining that it is unlikely that the workspace will include a command to act on in a future period; and sending an action to mute notifications from the workspace.

Aspect 13. A system comprising: a workspace, the workspace a ledger of commands wherein at least two autonomous agents add to the workspace and thereby interact; the at least two autonomous agents configured to determine whether to yield or act after a command is added to the workspace; and a workspace manager that is configured to add the commands to the workspace on behalf of the at least two autonomous agents, and to send updates to the workspace to the at least two autonomous agents so that they can determine whether to yield or act after the commands are added to the workspace.

Aspect 14. The system of aspect 13, wherein the at least two autonomous agents are a coordinator agent and a task agent, wherein the coordinator agent is configured to be a participant in a main channel of the workspace along with a user account, the coordinator agent is further configured to determine to invoke the task agent in response to a first command posted in the main channel by the user account.

Aspect 15. The system of any one of aspects 13-14, wherein the task agent is configured to act in response to a second command being posted to the workspace, the second command being from the coordinator agent, wherein the second command requests that a task be performed, the task agent is configured to act by preparing one or more third commands to be posted to the workspace, where the one or more third commands are responsive to the second command.

Aspect 16. The system of any one of aspects 13-15, wherein the task agent is further configured to request the workspace manager create a scratchpad within the workspace, and to write notes to the scratchpad for later reference by the task agent.

Aspect 17. The system of any one of aspects 13-16, wherein the workspace manager is further configured to enforce configurations of the workspace.

Aspect 18. The system of any one of aspects 13-17, wherein the commands included in the workspace are written as operation transforms.

Aspect 19. The system of any one of aspects 13-18, wherein the coordinator agent is further configured to determine that it is unlikely that the workspace will include a command to act on in a future period and send an action to mute notifications from the workspace until a period has elapsed or a condition has occurred.

Aspect 20. The system of any one of aspects 13-19, further comprising: a trace service that is configured to perform an event trace, wherein the event trace is a data flow graph associated with a particular agent decision event; and a review actions service that is configured to generate a decision score indicating a quality of an outcome resulting from the particular agent decision event, wherein the review actions service can observe the outcome and score the quality of the outcome, whereby the decision score can be stored in association with the data flow graph associated with the particular agent decision event, wherein the coordinator agent is trained to select the task agent or search for the another agent using reinforcement learning from the data flow graph and the associated decision score.

Aspect 21. A non-transitory computer readable medium comprising a storage storing instructions for implementing the method of any one of aspects 1-12, when executed the instructions are effective to configure the system of claims 13-14 to implementing the method.

What is claimed is:

1. A method comprising:
receiving, by a workspace manager, an instruction to invoke a task agent from a coordinator agent by posting an invite command inviting the task agent to a first channel in a workspace;

sending the invite command, by the workspace manager, to the task agent inviting the task agent to join the first channel in the workspace;

receiving, by the workspace manager, a join action command, from the task agent, to be posted in the first channel, whereby the task agent is joined to the first channel in the workspace with at least the coordinator agent, wherein the workspace is a ledger of commands wherein at least two artificial intelligence agents add to the workspace and thereby interact, wherein the coordinator agent and the task agent are configured to yield or act in response to a command added to the workspace other than commands posted by itself;

receiving from the coordinator agent a first command to be added to the workspace;

sending the first command to the task agent of the at least two artificial intelligence agents; and receiving, in response to the first command, a second command to post in the workspace, the second command indicates a determination by the task agent to act in response to the first command, wherein the commands in the ledger of commands are operational transforms that specify how a respective command is modifying the workspace, and wherein the at least two artificial intelligence agents interact with the workspace through one or more application programming interfaces of the workspace.

2. The method of claim 1, further comprising:
providing, by the workspace manager, a workspace view to the task agent, wherein the workspace view includes the ledger of commands filtered for channels to which the task agent has joined, including the first channel in the workspace.

3. The method of claim 2, further comprising:
sending, by the workspace manager, updates to the workspace view to the task agent that includes commands appended to the ledger of commands associated with the first channel; and
reviewing the updates to the workspace view by the task agent, wherein the reviewing results in a determination by the task agent to yield.

4. The method of claim 1, wherein the workspace includes a main channel that includes the coordinator agent and a user account.

5. The method of claim 4, wherein the workspace manager manages permissions for the main channel and the first channel.

6. The method of claim 1, further comprising:
sending, by the task agent, a create a scratchpad command to the workspace manager;
creating, a scratchpad by the workspace manager;
sending, by the task agent, a join new channel command to associate with the scratchpad; and
writing, by the task agent, notes to the scratchpad for later reference by the task agent.

7. The method of claim 1, further comprising:
prior to the invoking the task agent, determining, by the coordinator agent to invite the task agent.

8. The method of claim 7, further comprising:
storing, by a trace service, an event trace, wherein the event trace identifies related decision events leading up to and after a particular agent decision event; and
receiving, from a review actions service a decision score indicating a quality of an outcome resulting from the particular agent decision event;

wherein the first agent or second agent is trained to make a decision from the event trace and the associated decision score.

9. The method of claim 1, further comprising:
determining that it is unlikely that the workspace will include a message to act on in a future period; and
sending an action to mute notifications from the workspace.

10. A system comprising:
at least one processor;
a non-transitory computer readable medium for storing instructions, the instructions are effective to cause the at least one processor to host a workspace and a workspace manager, wherein the workspace manager is executed by the at least one processor to send an invite command to a task agent inviting the task agent to join a first channel in the workspace and to receive a join action command, from the task agent, to be posted in the first channel, whereby the task agent is joined to the first channel in the workspace with at least a coordinator agent;

wherein the workspace is a ledger of commands wherein at least two artificial intelligence agents add to the workspace and thereby interact, wherein the coordinator agent and the task agent are configured to determine whether to yield or act after a command is added to the workspace; and wherein the workspace manager is executed by the at least one processor to add the commands to the workspace on behalf of the coordinator agent and the task agent, and to send updates to the workspace to the coordinator agent and the task agent so that they can determine whether to yield or act after the commands are added to the workspace, wherein the commands in the ledger of commands are operational transforms that specify how a respective command is modifying the workspace, and wherein the at least two artificial intelligence agents interact with the workspace through one or more application programming interfaces of the workspace.

11. The system of claim 10, wherein the coordinator agent is configured to be a participant in a main channel of the workspace along with a user account, the coordinator agent is further configured to determine to invoke the task agent in response to a first command posted in the main channel by the user account.

12. The system of claim 11, wherein the task agent is configured to act in response to a second command being posted to the workspace, the second command being from the coordinator agent, wherein the second command requests that a task be performed, the task agent is configured to act by preparing one or more third commands to be posted to the workspace, where the one or more third commands are responsive to the second command.

13. The system of claim 12, wherein the task agent is further configured to request the workspace manager create a scratchpad within the workspace, and to write notes to the scratchpad for later reference by the task agent.

14. The system of claim 11, wherein the workspace manager is further executed by the at least one processor to enforce configurations of the workspace.

15. The system of claim 11, wherein the coordinator agent is further configured to determine that it is unlikely that the workspace will include a command to act on in a future period and send an action to mute notifications from the workspace until a period has elapsed or a condition has occurred.

16. The system of claim 11, further comprising:
a trace service that is configured to perform an event trace, wherein the event trace is a data flow graph associated with a particular agent decision event; and
a review actions service that is configured to generate a decision score indicating a quality of an outcome resulting from the particular agent decision event, wherein the review actions service can observe the outcome and score the quality of the outcome, whereby the decision score can be stored in association with the data flow graph associated with the particular agent decision event,
wherein the coordinator agent is trained to select the task agent or search for the another agent using reinforcement learning from the data flow graph and the associated decision score.

17. A non-transitory computer-readable storage medium, the computer-readable storage medium comprising instructions that when executed by a computer, cause at least one processor to:
receive, by a workspace manager, an instruction to invoke a task agent from a coordinator agent by posting an invite command inviting the task agent to a first channel in the workspace;
send the invite command, by the workspace manager, to the task agent inviting the task agent to join the first channel in the workspace;
receive, by the workspace manager, a join action command, from the task agent, to be posted in the first channel, whereby the task agent is joined to the first channel in the workspace with at least the coordinator agent, wherein the workspace is a ledger of commands wherein at least two artificial intelligence agents add to the workspace and thereby interact, wherein the coordinator agent and the task agent are configured to yield or act in response to a command added to the workspace;
receive from the coordinator agent, a first command to be added to the workspace;
send the first command to the task agent; and
receive, in response to the first command, a second command to post in the workspace, the second command indicates a determination by the task agent to act in response to the first command,
wherein the commands in the ledger of commands are operational transforms that specify how a respective command is modifying the workspace, and wherein the at least two artificial intelligence agents interact with the workspace through one or more application programming interfaces of the workspace.

18. The non-transitory computer-readable storage medium of claim 17, wherein the instructions further configure the at least one processor to:
receive, by the workspace manager, an instruction to invoke a task agent from a coordinator agent by posting an invite command inviting the task agent to a first channel in the workspace, wherein the first agent is the coordinator agent and the second agent is the task agent.

* * * * *